(12) United States Patent
Takashima et al.

(10) Patent No.: US 7,671,493 B2
(45) Date of Patent: Mar. 2, 2010

(54) VIBRATION ASSEMBLY, INPUT DEVICE USING THE VIBRATION ASSEMBLY, AND ELECTRONIC EQUIPMENT USING THE INPUT DEVICE

(75) Inventors: Kouichiro Takashima, Tokyo (JP); Shun Kayama, Saitama (JP); Tsutomu Takahashi, Kanagawa (JP); Yukiko Shimizu, Saitama (JP); Hideki Okii, Tokyo (JP); Takashi Sawada, Kanagawa (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 12/043,262

(22) Filed: Mar. 6, 2008

(65) Prior Publication Data

US 2008/0216578 A1 Sep. 11, 2008

(30) Foreign Application Priority Data

Mar. 9, 2007 (JP) .............................. 2007-060787

(51) Int. Cl.
 *H02K 35/00* (2006.01)
(52) U.S. Cl. ...................................... 310/15; 310/12.16
(58) Field of Classification Search ................... 310/15, 310/14, 17, 12.16, 81
 See application file for complete search history.

(56) References Cited

U.S. PATENT DOCUMENTS

| 5,602,432 | A | 2/1997 | Mizuiani | |
|---|---|---|---|---|
| 5,903,076 | A * | 5/1999 | Suyama | 310/81 |
| 6,404,085 | B2 * | 6/2002 | Hamaguchi et al. | 310/81 |
| 6,847,139 | B2 * | 1/2005 | Ueda et al. | 310/81 |
| 6,850,138 | B1 | 2/2005 | Sakai | |
| 7,212,647 | B2 * | 5/2007 | Kaneda et | 381/396 |
| 7,324,655 | B2 * | 1/2008 | Sato | 381/370 |
| 2002/0017824 | A1 * | 2/2002 | Sakai | 310/81 |
| 2003/0227225 | A1 * | 12/2003 | Kaneda et al. | 310/81 |

FOREIGN PATENT DOCUMENTS

| JP | 57-078298 | 5/1982 |
|---|---|---|
| JP | 7-30134 | 7/1995 |
| JP | 8-11032 | 3/1996 |

(Continued)

OTHER PUBLICATIONS

EP Communication dated Aug. 1, 2008 for Application No. 08843102.2-2213.

*Primary Examiner*—Nguyen N Hanh
(74) *Attorney, Agent, or Firm*—Sonnenschein Nath & Rosenthal LLP

(57) ABSTRACT

A vibration assembly includes a container, a vibration member containing a hollow portion with a bottom, at least two support members, a magnetic body, a coil having a spool axis, and a diaphragm that is attached to the container. Each of the support members has a flat and corrugated configuration. An end of the one of the support members is bonded to a portion of an edge portion of the hollow portion of the vibration member. The other end of the one of the support members is fixed to a portion of an upper edge of the container. An end of the other support member is bonded to the other portion of the edge portion of the hollow portion of the vibration member. The other end of the other support member is fixed to the other portion of the upper edge of the container.

7 Claims, 13 Drawing Sheets

FOREIGN PATENT DOCUMENTS

| | | |
|---|---|---|
| JP | 08-065990 | 3/1996 |
| JP | 2570923 | 2/1998 |
| JP | 2000-062945 | 2/2000 |
| JP | 2001-117717 | 4/2001 |
| JP | 2001-129479 | 5/2001 |
| JP | 2001-259525 | 9/2001 |
| JP | 2002-001215 | 1/2002 |
| JP | 2002-045791 | 2/2002 |
| JP | 2002-126644 | 5/2002 |
| JP | 2002-263573 | 9/2002 |
| JP | 2002-336786 | 11/2002 |
| JP | 2002-361174 | 12/2002 |
| JP | 2004-094389 | 3/2004 |
| JP | 2004-186912 | 7/2004 |
| JP | 2004-202424 | 7/2004 |
| JP | 2004-266384 | 9/2004 |
| JP | 2004-305865 | 11/2004 |
| JP | 2004-358443 | 12/2004 |
| JP | 2005-244743 | 9/2005 |
| JP | 2005-324162 | 11/2005 |
| JP | 2006-007161 | 1/2006 |
| JP | 2006-068688 | 3/2006 |
| JP | 2006-075734 | 3/2006 |
| JP | 2006-93774 * | 4/2006 |
| JP | 2006-136760 | 6/2006 |
| JP | 2006-167523 | 6/2006 |
| JP | 2007-007515 | 1/2007 |
| JP | 2007-129678 | 5/2007 |

* cited by examiner

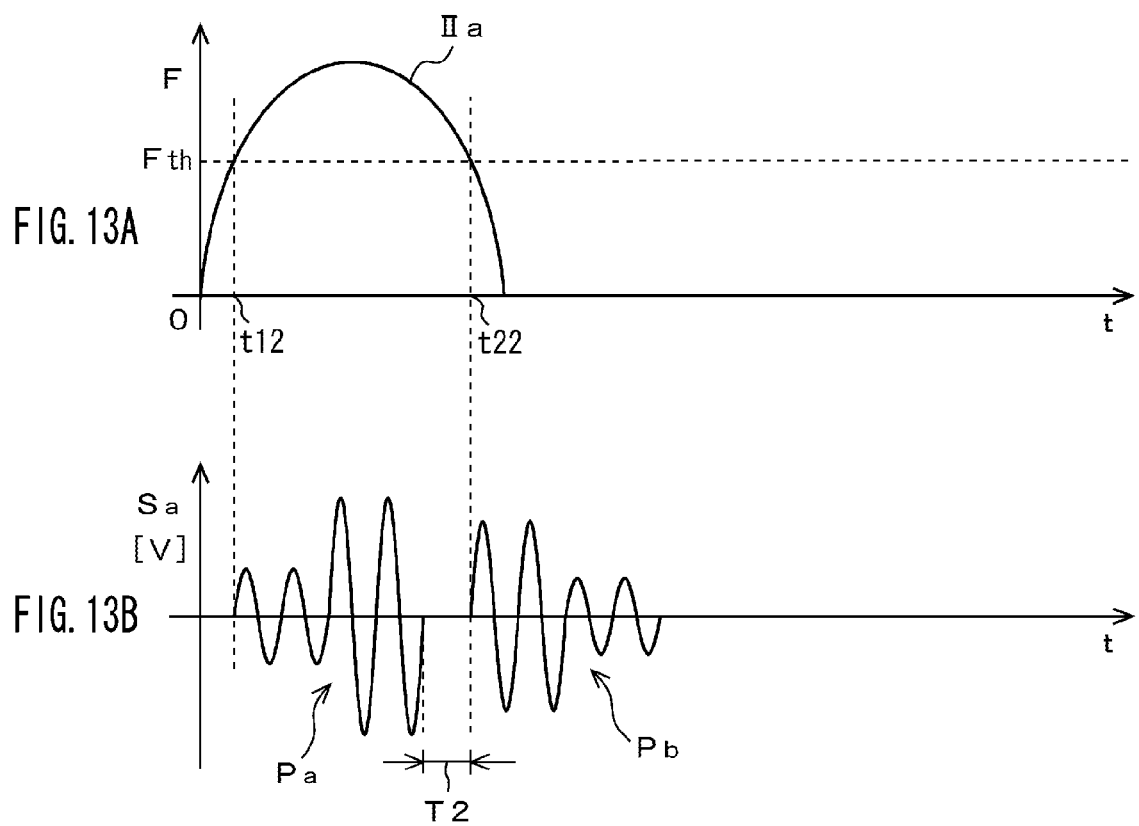

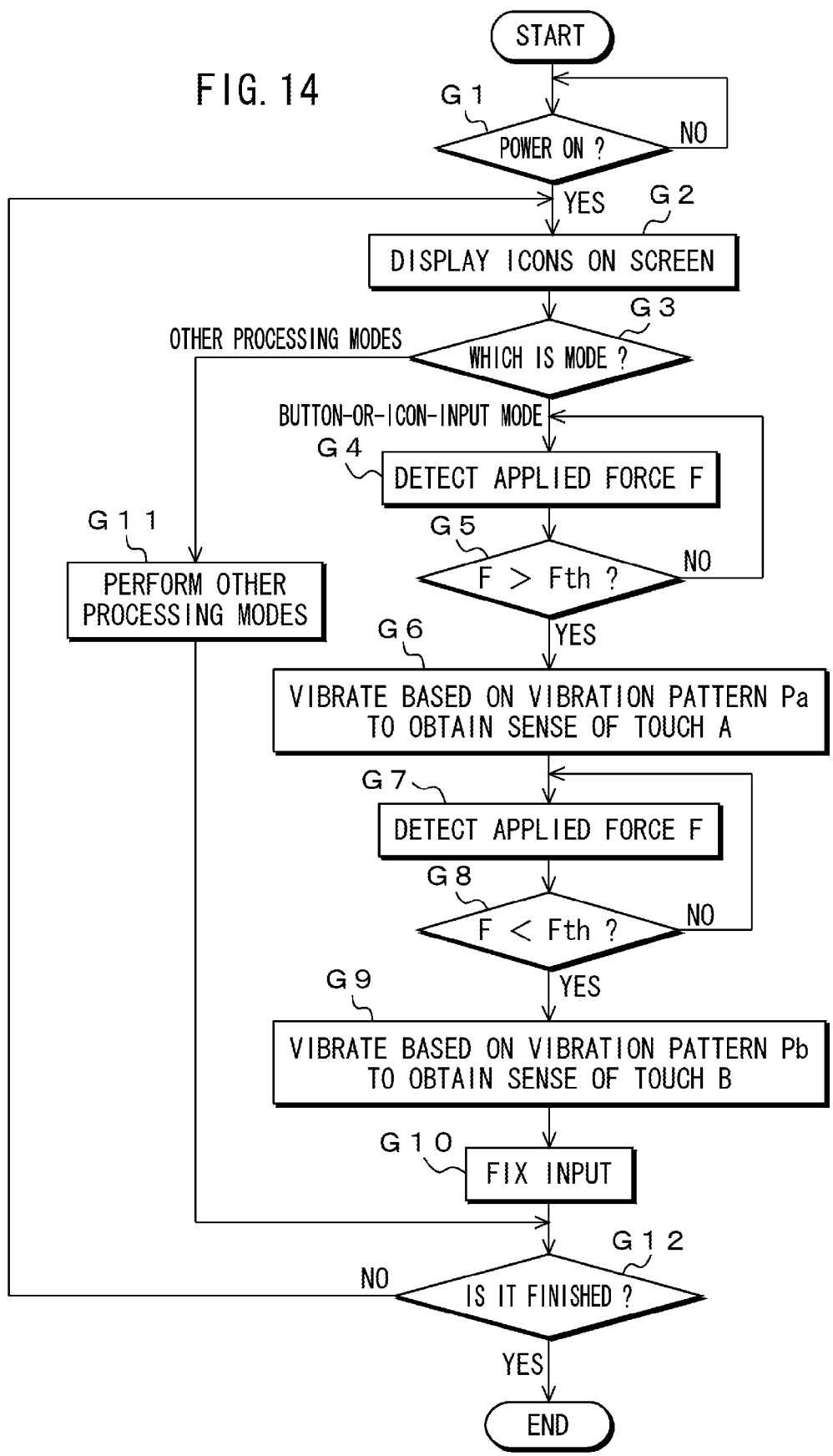

VIBRATION ASSEMBLY, INPUT DEVICE USING THE VIBRATION ASSEMBLY, AND ELECTRONIC EQUIPMENT USING THE INPUT DEVICE

CROSS-REFERENCES TO RELATED APPLICATIONS

The present invention contains subject matter related to Japanese Patent Application JP 2007-060787 filed in the Japanese Patent Office on Mar. 9, 2007, the entire contents of which being incorporated herein by reference.

BACKGROUND OF THE INVENTION

1. Field of the Invention

The present invention relates to a vibration assembly, input device containing the vibration assembly, which can realizes feedback of a vibration to a user by the user's sense of touch, and electronic equipment such as an information-processing device, a mobile phone, and a personal digital assistant (PDA), which contains the input device.

2. Description of Related Art

User has recently captured various kinds of contents on electronic equipment such as an information-processing device, a mobile telephone, and a PDA and utilized the contents. The electronic equipment has any input device. The input device contains a key board and a jog dial, and a touch panel equipped with a display unit.

Input/output device combined with actuator has been developed. In such the actuator, at least two-layer piezoelectric elements that have different strains or a piezoelectric element and a non-piezoelectric element are laminated together. The actuator dynamically utilizes any deformation of the layered elements by difference in the strains generated between or among the layered elements when applying vibration control electric voltage to the piezoelectric element in the laminated elements.

Japanese Patent Application Publication No. 2004-94389 has disclosed electronic equipment equipped with such the piezoelectric actuator and input/output device therefor. The electronic equipment contains input/output device having multilayered bimorph type piezoelectric actuator and a touch panel. The multilayered bimorph type piezoelectric actuator feeds any different vibrations back to the user by the user's sense of touch through the touch panel based on any species of information. The input/output device contains a piezoelectric-element-supporting structure such that piezoelectric actuators are attached to the support frame through supporting parts. Another supporting part is bonded on a middle of each of the piezoelectric actuators and this supporting part connects the touch panel. When applying any vibration control electric voltages to the piezoelectric actuators, any vibrations can be transferred to the touch panel.

In such a feedback control using these piezoelectric actuators, the touch panel detects any input (position or applied force) from outside, a control system triggers a vibration of the touch panel or a casing based on the input information from the touch panel.

On the other hands, mobile phones of biaxial hinged type, straight type, and slide type often have display panels each attaching a receiver on an upper portion thereof near its display portion. The receiver drives a diaphragm based on the principle of a magnet speaker of a voice coil scheme to communicate voice and the like of the party on the other end to the user during a telephone conversation or delivers any relatively small sound effects or the like based on the user's manipulation of the mobile phone.

SUMMARY OF THE INVENTION

If the input/output device equipped with the piezoelectric actuator disclosed in Japanese Patent Application Publication No. 2004-94389 is applied to the mobile phones of biaxial hinged type, straight type, and slide type, or a display monitor of a video camera or a digital camera to realize feedback of the vibrations to the user by the user's sense of touch, both of a speaker for the receiver or sound effects and a piezoelectric actuator for feedback of the vibrations to the user by the user's sense of touch are installed. An additional space for installing these parts may be required in a casing installing a display panel.

A speaker for sounding a ringtone or a ringtone melody has a diameter of about 16 mm and a height of 2.4 mm in the above-type mobile phone, and the speaker is bigger than the receiver. The speaker is often installed in a lower casing equipped with a manipulation key, not in an upper casing equipped with the display monitor. It is thus difficult to apply the speaker for the ringtone melody or the like to the upper casing equipped with the display monitor as an actuator for feedback of the vibration to the user by the user's sense of touch.

Even if applying the speaker for the ringtone melody or the like to the upper casing equipped with the display monitor as an actuator for feedback of the vibration to the user by the user's sense of touch, the mobile phone may have a larger section or result in an increase in cost.

It is desirable to provide a vibration assembly, input device containing the vibration assembly, which can realizes feedback of a vibration to a user by the user's sense of touch, and electronic equipment containing the input device, in which an actuator as the vibration assembly can be reduced in size and have both of actuator and speaker functions.

According to an embodiment of the present invention, there is provided a vibration assembly containing a container, a vibration member containing a hollow portion with a bottom, which is movably positioned within the container, at least two support members that support the vibration member movably within the container, a magnetic body that is fixed to the bottom in the hollow portion of the vibration member movably supported within the container, a coil having a spool axis, which is movably positioned around the magnetic body, and a diaphragm that is attached to the coil at a side of the spool axis of the coil and attached to the container.

One of the support members has a flat and corrugated configuration. An end of the one of the support members is bonded to a portion of an edge portion of the hollow portion of the vibration member. The other end of the one of the support members is fixed to a portion of an upper edge of the container. Other support member has a flat and corrugated configuration. An end of the other support member is bonded to the other portion of the edge portion of the hollow portion of the vibration member. The other end of the other support member is fixed to the other portion of the upper edge of the container.

The vibration assembly according to an embodiment of the present invention vibrates the diaphragm to act as a speaker when applying an audio signal to the coil movably positioned around the magnetic body. Alternatively, by the vibration assembly according to an embodiment of the present invention, when applying a low frequency signal for feedback of a vibration to a user to the coil, the vibration member vibrates based on the resonance frequency given by the expression that is in inverse proportion to a square root of the cube of the length of the support member having a flat and corrugated configuration and is in proportion to a square root of the cube of the thickness of the support member. This enables the feedback of a vibration to a user to be performed. Further, the support members convert a direction of a vibration generated along the spool axis of the coil to a direction perpendicular to the spool axis of the coil. Such the configuration allows the vibration assembly to be downsized.

Thus, according to the embodiment of the present invention, it is capable of providing a very small size vibration assembly with speaker function.

According to another embodiment of the present invention, there is provided input device that presents feedback of a vibration to a user by the user's sense of touch when the user inputs information to the device. The input device contains input-detecting unit that detects an input manipulation by the user, and a vibration assembly that presents feedback of the vibration to the user by the user's sense of touch based on the user's manipulation on the input-detecting unit. Such the vibration assembly contains the above configuration.

By an embodiment of the input device according to the invention, the input device contains an embodiment of the vibration assembly according to the invention so that the input device can act as a speaker when applying an audio signal to the coil movably positioned around the magnetic body.

Alternatively, by the embodiment of the input device according to the present invention, when applying a low frequency signal for feedback of a vibration to a user to the coil based on the user's manipulation on the input-detecting unit, the vibration member vibrates based on the resonance frequency given by the expression that is in inverse proportion to a square root of the cube of the length of the support member having a flat and corrugated configuration and is in proportion to a square root of the cube of the thickness of the support member. This enables the feedback of a vibration to be presented to a user.

Such the input device can have both of receiver function and actuator function. This results in reduction in its costs.

According to further embodiment of the present invention, there is provided electronic equipment that presents feedback of a vibration to a user by the user's sense of touch when the user inputs information to the equipment. The electronic equipment contains the above input device. The input device includes the above vibration assembly.

By the embodiment of the electronic equipment according to the invention, the electric equipment contains the embodiment of the input device according to the invention, which includes the embodiment of the vibration assembly, so that the electronic equipment can act as a speaker when applying an audio signal to the coil movably positioned around the magnetic body.

Alternatively, by the embodiment of the electronic assembly according to the present invention, when applying a low frequency signal for feedback of a vibration to a user to the coil based on the user's manipulation on the input-detecting unit, the vibration member vibrates based on the resonance frequency given by the expression that is in inverse proportion to a square root of the cube of the length of the support member having a flat and corrugated configuration and is in proportion to a square root of the cube of the thickness of the support member. This enables the feedback of a vibration to be presented to a user.

Such the electronic equipment contains the vibration assembly that also serves as the vibrator and the receiver, so that the electronic equipment can be downsized.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 13A and 13B are graphs for showing another example of a relationship between applied force and vibration patterns;

FIG. 14 is a flowchart for showing an example of information processing in the mobile phone shown in FIG. 6.

DESCRIPTION OF THE PREFERRED EMBODIMENTS

The following will describe embodiments of a vibration assembly, input device, and electronic equipment according to the present invention with reference to the accompanied drawings.

Figure 1:
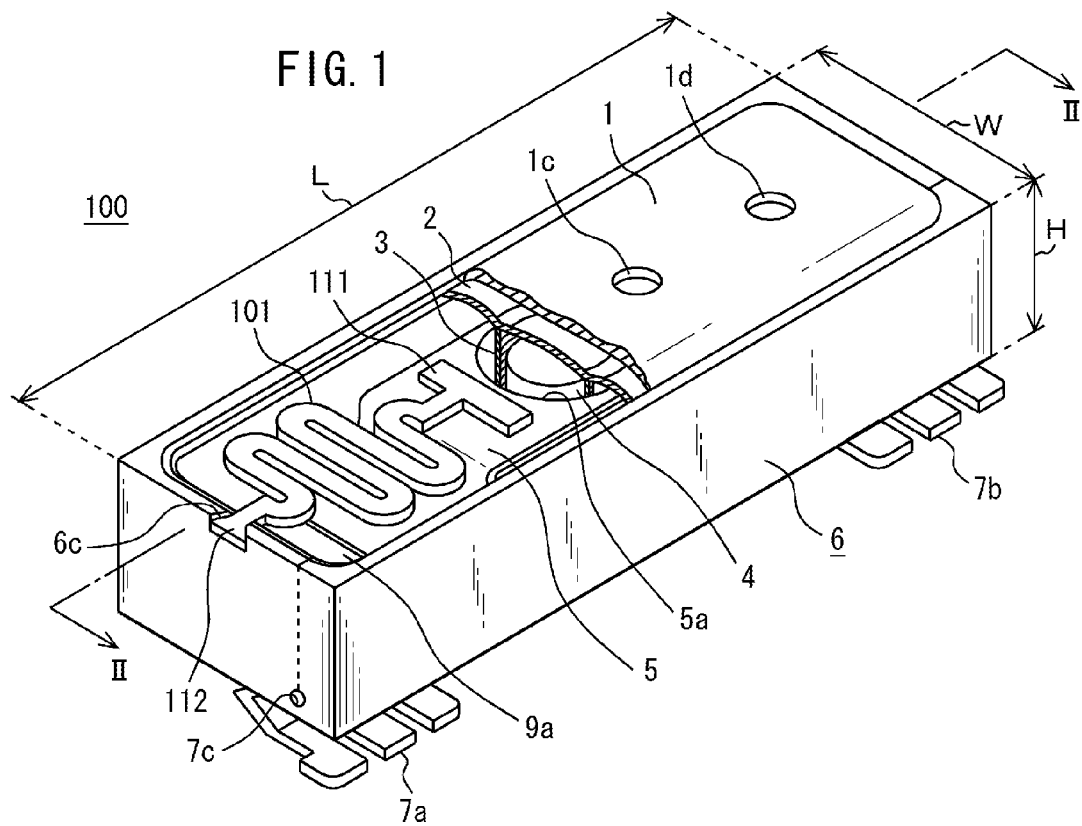
FIG. 1 is a partially cutaway perspective diagram for illustrating a configuration of a speaker with an actuator function, to which an embodiment according to the invention is applicable.
Figure 2:
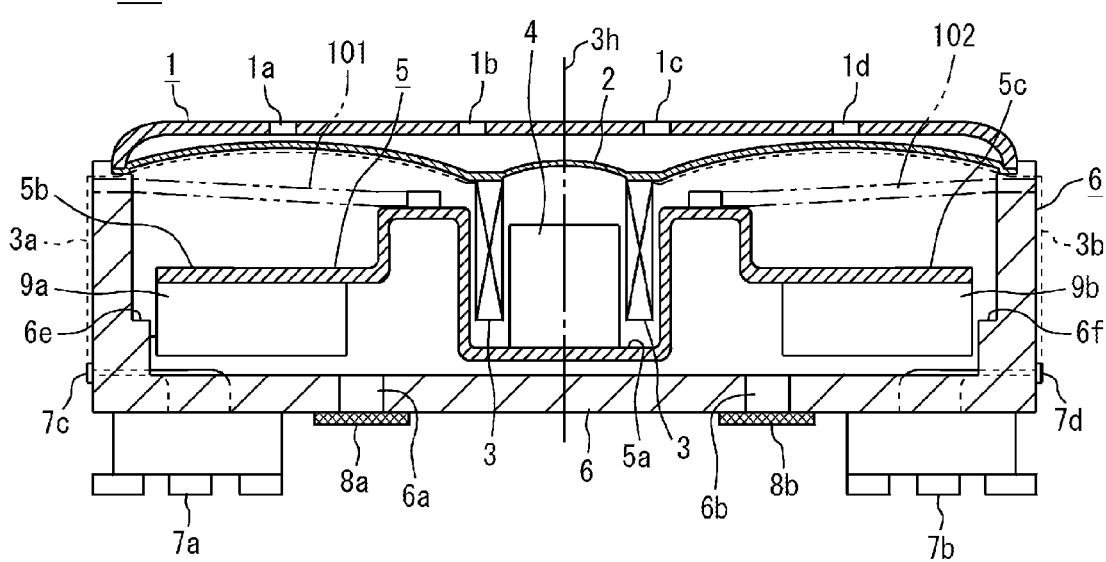
FIG. 2 is a cross sectional view of the speaker taken along lines II-II shown in FIG. 1.

FIG. 1 illustrates a configuration of a very small size speaker 100 with an actuator function, to which an embodiment of a vibration assembly according to the invention is applicable. FIG. 2 is a cross sectional view of the speaker 100.

The speaker 100 has both of a speaker function and an actuator function that generates any vibration for user's sense of touch. The speaker 100 is applicable to any electronic equipment such as an information-processing device, a mobile phone, and a PDA, which presents feedback of a vibration to a user by the user's sense of touch when the user input any information by selecting an item from input selection items displayed on a screen by an icon.

The speaker 100 has a housing 6 constituting a container and a lid 1 that is attached on the housing 6 after containing any members in the housing 6. The housing 6 has a length L of about 15 mm, a width W of about 5 mm, and a height H of about 3 mm. The lid 1 contains some openings at predetermined positions. In this embodiment, the lid 1 contains four openings 1a, 1b, 1c, and 1d for leaking any sounds to outside (see FIG. 2). The lid 1 is made of plastic and molded in this embodiment.

The housing 6 also contains a yoke 5 constituting a vibration member. The yoke 5 contains a hollow portion 5a with a bottom. The yoke 5 is movably positioned within the housing 6. For example, springs 101, 102 each having a flat and corrugated configuration support the yoke 5 movably in the housing 6.

In this embodiment, the spring 101 constitutes a first support member. An end of the spring 101 is bonded to a portion of an edge portion of the hollow portion 5a of the yoke 5, and the other end of the spring 101 is fixed to a portion of an upper edge of the housing 6. The spring 102 constitutes a second support member. An end of the spring 102 is bonded to the other portion of the edge portion of the hollow portion 5a of the yoke 5, and the other end of the spring 102 is fixed to the other portion of the upper edge of the housing 6. In this example, each of the springs 101, 102 has the flat and corrugated configuration so that a vibration system can be elastically supported.

A magnet 4 (permanent magnet) constituting a magnetic body is fixed to a bottom in the hollow portion 5a of the yoke 5 movably supported within the housing 6. The magnet 4 is made of neodymium and has a column configuration. A movable coil 3 (voice coil) is movably positioned around the magnet 4. The coil 3 has a spool axis 3h. The coil 3 receives any audio signals and/or any vibration generation signals.

A diaphragm 2 is attached to the coil 3 at a side of the spool axis 3h of the coil 3 and an outer edge of the diaphragm 2 is attached to the housing 6 by holding the outer edge of the diaphragm 2 on the upper edge of the housing 6 by the lid 1. The housing 6 has, on its underside, electrodes 7a, 7b which are connected to the coil 3 inside the housing 6. Any audio signals, any vibration-generating signals and the like are supplied to the electrodes 7a, 7b.

The housing 6 has, for example, two holes 6a, 6b on its bottom between the electrodes 7a and 7b, as shown in FIG. 2, positioned on the underside of the housing 6. Mesh seals 8a and 8b cover the holes 6a, 6b on the bottom of the housing 6. The mesh seal 8a covers the hole 6a and the mesh seal 8b covers the hole 6b. The mesh seals 8a, 8b have any ventilation functions to allow air to enter and move around the housing 6.

The electrode 7a has a terminal 7c and the electrode 7b has a terminal 7d. The terminal 7c connects a lead line 3a of the coil 3 on a side wall of the housing 6 and terminal 7d connects a lead line 3b of the coil 3 on another side wall of the housing 6. For example, the lead line 3a extends from the coil 3 to an upper edge of the housing 6 through a space under a side of the diaphragm 2, leaves the housing 6 at its upper edge to outside to extend downward on the side wall of the housing 6, and reaches the terminal 7c, thereby enabling the lead line 3a to connect the electrode 7a. Similarly, the lead line 3b extends from the coil 3 to an upper edge of the housing 6 through a space under the other side of the diaphragm 2, leaves the housing 6 at its upper edge to outside to extend downward on the above another side wall of the housing 6, and reaches the terminal 7d, thereby enabling the lead line 3b to connect the electrode 7b.

The yoke 5 has right and left arms 5b, 5c in addition to the hollow portion 5a with a bottom. Weights 9a, 9b respectively bond to undersurfaces of the right and left arms 5b, 5c. Namely, the weight 9a bonds to the undersurface of the left arm 5b by any adhesive agent. The weight 9b bonds to the undersurface of the right arm 5b by any adhesive agent. Each of the weights 9a, 9b has a weight of, for example, about 0.597 grams. Each of the weights 9a, 9b has a thickness of about 2 mm, which is roughly the same as a distance between each of the undersurfaces of the right and left arms 5b, 5c and the bottom of the housing 6. Thus, there occurs only any very small space between each of the undersurfaces of the weights 9a, 9b and the bottom of the housing 6. This enables any stroke (space) of the yoke 5 to be kept in the spool axis direction of the coil 3 while maintaining the loads of the weights 9a, 9b.

Figure 3:
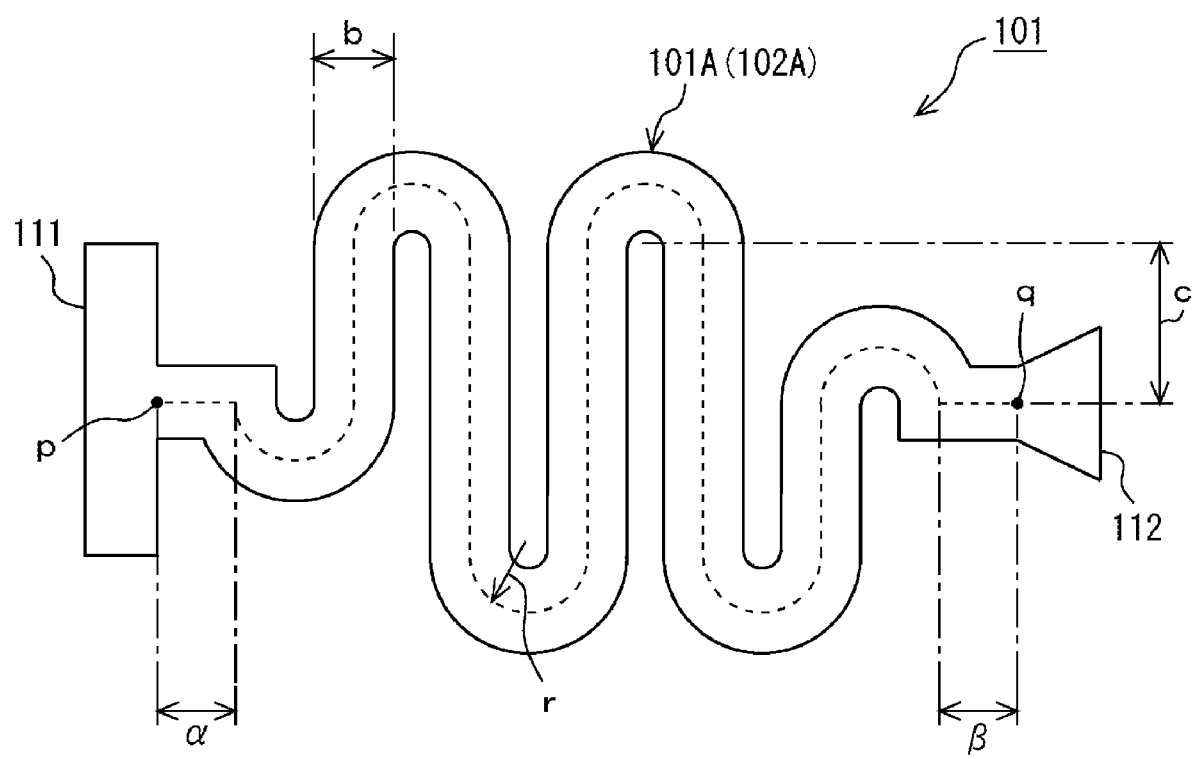
FIG. 3 is a top plan view of a support member, a spring, having a flat and corrugated configuration, the spring being enlarged.

FIG. 3 shows the spring 101 having a flat and corrugated configuration in order to calculate a length thereof.

The spring 101 has a T-shaped end 111 for being bonded and the other trapezoidal end 112. A resonance frequency fo of the yoke 5 is given by an expression (1):

$$Fo = 1/2\pi \times \{\sqrt{n(3E(bh^3/12))/Ml^3}\} \quad (1)$$

where l indicates a length of the spring 101, h indicates a thickness of the spring 101, b indicates a width of the spring 101, n indicates number of the springs, M indicates a load that is imposed on the springs 101, 102, and E indicates Young's modulus.

The length 1 of the spring is defined as an addition of lengths shown by dotted lines in FIG. 3 from an end point p up to a termination point q along a middle line of the width b. The end point p indicates a beginning point in a length of a spring as the spring is effective.

The length l of the spring along the dotted lines is given by an expression (2):

$$l = (\alpha+\beta) + 2\pi r \cdot 180/360 \times 6 + 8 \cdot c \quad (2)$$

where α indicates a length of a portion projected from the T-shaped end 111 of the spring 101, β indicates a length of a portion projected from the trapezoidal end 112 of the spring 101, c indicates a length of folded dotted lines in the corrugated portion 101A of the spring 101, r indicates a radius of the U-shaped folded portion in the corrugated portion 101A of the spring 101.

In this embodiment, the length α of a portion projected from the T-shaped end 111 of the spring 101 is about 0.2 mm. The length β of a portion projected from the trapezoidal end 112 of the spring 101 is about 0.2 mm. The length c of folded dotted lines in the m corrugated portion of the spring 101 is 0.7 mm. The radius r of the U-shaped folded portion in the corrugated portion 101A of the spring 101 is 0.5 mm. Therefore, the length l of the spring 101 along the dotted lines is about 15.42 mm according to the expression (2).

In this embodiment, the width d of each of the springs 101, 102 is about 0.8 mm. The length l of each of the springs 101, 102 along the dotted lines is about 15.42 mm. The thickness of each of the springs 101, 102 is about 0.15 mm. The number n of the springs is two. The load M that is imposed on the springs 101, 102 is, for example, 0.597 g. Young's modulus is E. The resonance frequency fo of the yoke 5 is about 213 Hz according to the expression (1). This enables to be given a value the resonance frequency fo that is available for feedback of a vibration to a user by the user's sense of touch.

In this embodiment, the spring 101 and the like having a flat and corrugated configuration convert a direction of a vibration generated along the spool axis 3h of the coil 3 to a direction perpendicular to the spool axis 3h of the coil 3. This is because the corrugated portion 101A of the spring 101 is positioned in the direction perpendicular to the spool axis 3h of the coil 3 and along a longitudinal direction of the housing 6. Such the spring 101 and the like thus configured allows the user to touch a surface of a display portion of a input device in the spool axis 3h stronger when the speaker 100 with the actuator function is positioned in parallel with the surface of a display portion, thereby presenting any feedback of a stronger vibration to a user by the user's sense of touch.

Figure 4:
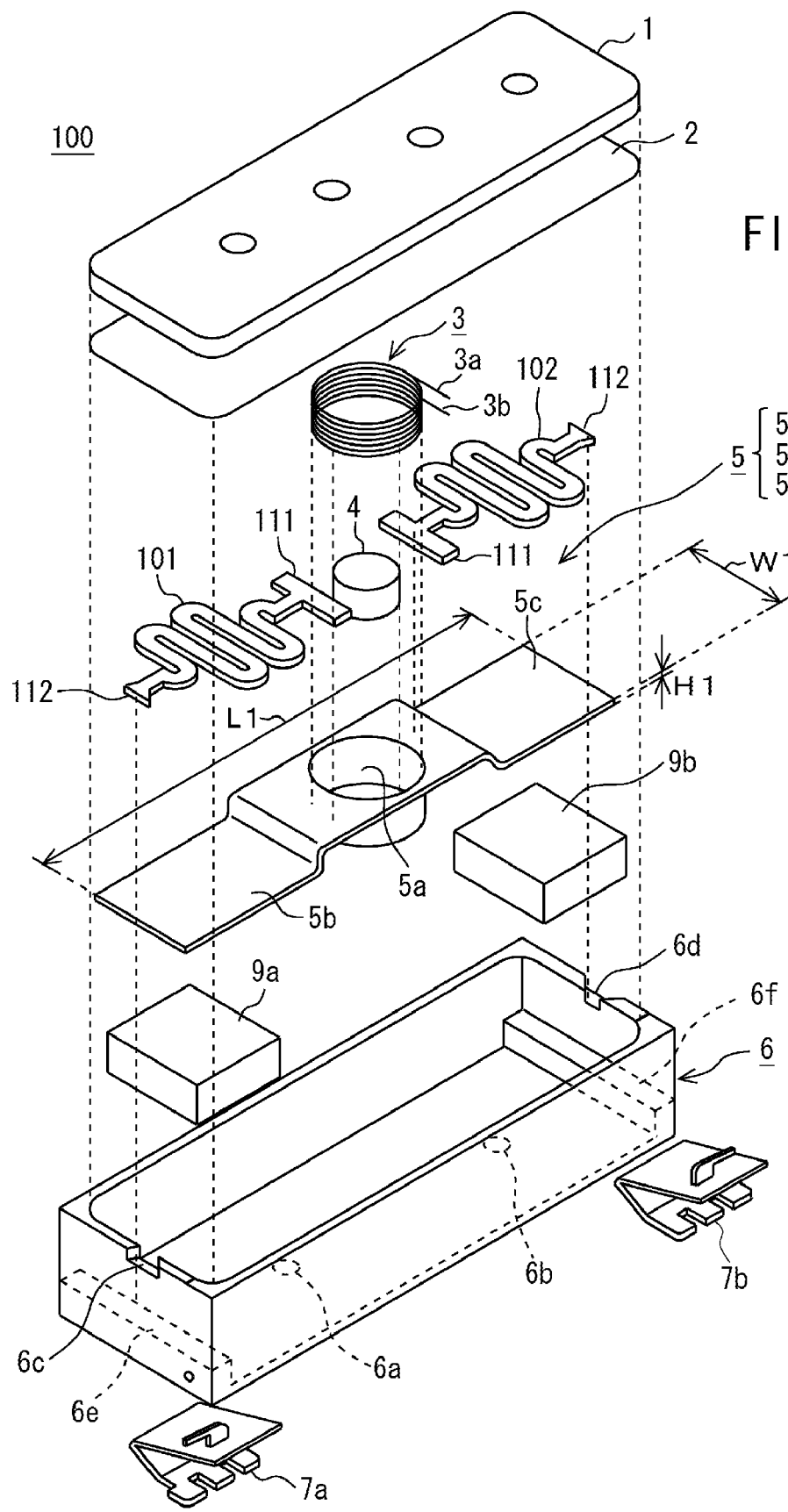
FIG. 4 is an exploded perspective view of the speaker shown in FIG. 1.

FIG. 4 shows an assembly example of the speaker 100 with the actuator function. The housing 6 is first prepared relative to the speaker 100. In this embodiment, a die is manufactured to create the housing 6 having holes 6a, 6b on its bottom, trapezoidal recess portions 6c, 6d for fitting the springs on its upper edge, reinforcement portions 6e, 6f for both of electrode attachment and rolling restraint. Any plastic resins such as ABS resins are injected into the die to form the molded housing 6. PC resins may be used in place of the ABS resins.

In this moment, the electrodes 7a, 7b are respectively fitted into the reinforcement portions 6e, 6f inside the housing 6 by pressing them. The electrodes 7a, 7b may be fitted to the housing 6 by inserting the electrodes 7a, 7b and the housing 6 into the die. The electrodes 7a, 7b have pantograph forms.

The electrodes 7a, 7b are made by punching phosphorus bronze plate having a thickness of about 0.5 mm. The electrodes 7a, 7b are plated. For example, components constituting each of the electrodes 7a, 7b are plated with Ni as to have a thickness of about 2 to 3 μm, plated with Ni—Pd as to have a thickness of about 1 to 3 μm or plated with Cu as to have a thickness of about 0.03 μm. This enables to be given a container that can contain any vibration parts and the like.

Next, the magnet 4, the weights 9a, 9b, and the springs 101, 102 having the flat and corrugated configuration are attached to the yoke 5. The yoke 5 has a hollow portion 5a with a bottom on the middle thereof and right and left arms 5b, 5c. The yoke 5 has a length L1 of about 10 mm, a width W1 of about 3 mm, and a height of about 1.5 mm. In this embodiment, the yoke 5 is made by pressing a stainless plate (SUS301) having a thickness of about 0.3 mm to form the hollow portion 5a with a bottom on the middle thereof and right and left arms 5b, 5c.

The magnet 4 is bonded to the bottom of the hollow portion 5a of the yoke 5. For example, the magnet 4 is bonded to the bottom of the hollow portion 5a using, for example, any adhesive agent of urethane system. As the magnet 4, any magnetic member such as neodymium having a column shape is used.

The weight 9a is bonded to the undersurface of the left arm 5b using any adhesive agents. The weight 9b is also bonded to the undersurface of the right arm 5c using any adhesive agents. Each of the weights 9a, 9b has a weight of, for example, about 0.597 g. Any adhesive agent of urethane system can be used.

The T-shaped end 111 of the spring 101 is bonded to a portion of an edge portion of the hollow portion 5a of the yoke 5 and the T-shaped end 111 of the spring 102 is bonded to another portion, which is positioned at the opposite side of the above portion across the hollow portion 5a, of the edge portion of the hollow portion 5a of the yoke 5. In this embodiment, the springs 101, 102 are made by etching or pressing the stainless plate (SUS301) having a thickness of about 0.15 mm to form the springs 101, 102 having a flat and corrugated configuration. When etching it, a wave-form resist film is first applied onto the stainless plate on a substrate.

In this moment, the resist films are also applied onto the stainless plate so that the springs 101, 102 can have a total length of 15.42 mm and a width of 0.8 mm as well as the end of each of the springs 101, 102 can be formed as T-shaped one and the other end of each of the springs 101, 102 can be formed as trapezoidal one. Further, unnecessary portion is removed from the stainless plate using any solvent with the stainless plate being masked by these resist films. This enables the springs 101, 102 having the flat and corrugate configuration, each of which has T-shaped end 111 for fitting and the other trapezoidal end 112 (see FIG. 3).

After the springs 101, 102 have been prepared, they are bonded to the portions opposite to each other of the edge portion of the hollow portion 5a on the middle of the yoke 5. In this moment, the T-shaped ends 111 of the springs 101, 102 are bonded or welded to the portions near the upper edges of the hollow portion 5a of the yoke by electric welding or gas welding. This enables to be obtained a vibration part that can be contained in the housing 6.

Next, the diaphragm 2 and the coil 3 are bonded together as to form a voice coil part. As the diaphragm 2, any film material having a thickness of about 25 μm is used, which has almost the same size as that of the lid 1. As the film material, polyethylene naphthalate (PEN), polyethylene terephthalate (PET) or the like can be used. The diaphragm 2 is formed as a corn. The coil 3 is constituted of a copper wire having a diameter of about 0.05 mm. The coil 3 is formed as a hollow column by winding the copper wire to only predetermined turns.

After the diaphragm 2 and the coil 3 have been prepared, a side of the column coil 3 is bonded to a middle of undersurface of the diaphragm 2 using any adhesive agent of urethane system. This enables to be obtained the voice coil part that can be attached to an upper portion of the housing 6.

After the vibration part and the voice part as described above have been prepared, they are contained in the housing 6 equipped with the electrodes 7a, 7b, thereby assembling the speaker 100 with the actuator function. In this embodiment, the lead line 3a of the coil 3 solders the terminal 7c of the electrode 7a that is exposed outside the housing 6 and similarly, the lead line 3b of the coil 3 solders the terminal 7d of the electrode 7a that is exposed outside the housing 6.

The yoke 5 is then installed in the housing 6. In this moment, the trapezoidal end 112 of the spring 101 is fitted into the trapezoidal recess portions 6c of the housing 6. Similarly, the trapezoidal end 112 of the spring 102 is fitted into the trapezoidal recess portions 6d of the housing 6.

The diaphragm 2 to which the coil 3 has been bonded is inserted into the housing 6 from above. In this moment, such the diaphragm 2 is inserted into the housing 6 so that the spool portion of the coil 3 can cover the magnet. The lid 1 is then aligned to the housing 6 and an edge of the diaphragm 2 is bonded to the housing 6 using any adhesive agent with the edge of the diaphragm 2 being held between the lid 1 and the upper end of the housing 6. This enables to be realized the speaker 100, shown in FIG. 1, with the actuator function in which the yoke 5 is movable inside the housing 6.

Thus, according to the speaker 100 with the actuator function of this embodiment, the speaker 100 can act as a speaker when an audio signal is input to the coil 3 that is movably positioned around the magnet 4.

Further, when applying a low frequency (for example, 213 Hz) signal for feedback of a vibration to a user to the coil 3, the speaker 100 can vibrate the yoke 5 based on the resonance frequency fo given by the expression (1) that is in inverse proportion to a square root of the cube of the length of the spring 101 or 102 having a flat and corrugated configuration and is in proportion to a square root of the cube of the thickness of the spring.

The springs 101 and 102 convert a direction of a vibration generated along the spool axis 3h of the coil 3 to a direction perpendicular to the spool axis 3h of the coil 3 by the corrugated portions 101A, 102A of the springs 101, 102. The speaker 100 with the actuator function of this embodiment can be reduced in size. This allows a very small sized receiver with an actuator function to be realized and presented. Particularly, such the receiver may be sufficiently applied to input device that presents feedback of a vibration to a user by the user's sense of touch, which is attached to the electronic equipment such as a mobile phone on a display side.

Figure 5:
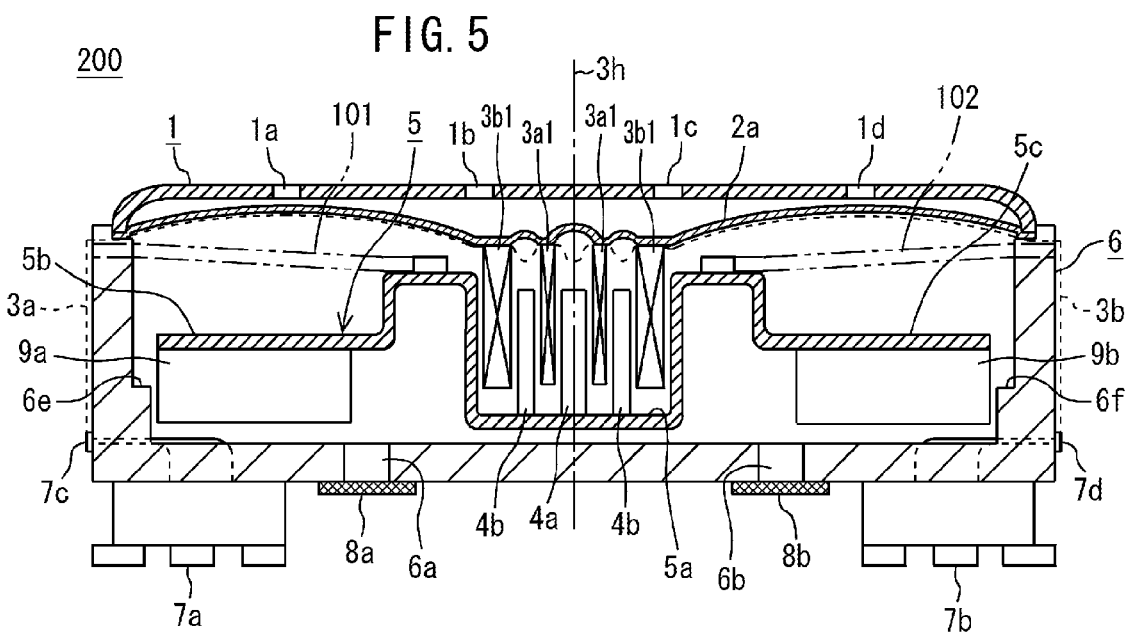
FIG. 5 is a cross section for illustrating a configuration of a speaker with an actuator function, to which another embodiment according to the invention is applicable.

FIG. 5 illustrates a configuration of an embodiment of a speaker 200 with an actuator function according to the invention.

In this embodiment, in order to present feedback of a stronger vibration to a user by the user's sense of touch, two coils 3a1, 3b1 have different diameters and are connected in series to each other as well as two magnets 4a, 4b have different configurations and are coaxially arranged. It is to be noted that like reference characters in the above embodiment shown in FIGS. 1 through 4 refer to like elements in this embodiment, detailed description of which will be omitted.

In the speaker 200 with an actuator function as shown in FIG. 5, the (permanent) magnets 4a, 4b constituting a magnetic body are fixed to the bottom in the hollow portion 5a of the yoke 5 movably supported within the housing 6. The magnet 4a has a column configuration and a narrower diameter than that of the magnet 4 in the above embodiment shown in FIGS. 1 through 4. The magnet 4b has a ring-shaped section and is coaxially and outwardly arranged around the magnet 4a.

The coil 3a1 (voice coil) is movably positioned around the magnet 4a. The coil 3b1 (voice coil) is movably positioned around the magnet 4b. The two coils 3a1, 3b1 has the same spool axis 3h. The coils 3a1, 3b1 are connected in series to each other, which receives an audio signal, a vibration-generating signal and the like.

A diaphragm 2a is attached to the coils 3a1, 3b1 at a side of the spool axis 3h of the coils 3a1, 3b1. An edge of the diaphragm 2a is bonded to the housing 6 using any adhesive agent with the edge of the diaphragm 2 being held between the lid 1 and the upper end of the housing 6.

Thus, according to the speaker 200 with the actuator function of this embodiment, similar to the embodiment shown in FIGS. 1 through 4, the speaker 200 can act as a speaker when an audio signal is input to the coil 3a1 that is movably positioned around the magnet 4a and the coil 3b1 that is movably positioned around the magnet 4b.

Further, when applying a low frequency (for example, 213 Hz) signal for feedback of a vibration to a user to the coils 3a1, 3b1, the speaker 100 can vibrate the yoke 5 based on the resonance frequency fo described in the embodiment shown in FIGS. 1 through 4.

In this embodiment, similar to the embodiment shown in FIGS. 1 through 4, the springs 101 and 102 convert a direction of a vibration generated along the spool axis 3h of the coils 3a1, 3b1 to a direction perpendicular to the spool axis 3h of the coils 3a1, 3b1 by the corrugated portions 101A, 102A of the springs 101, 102. This allows a very small sized receiver with an actuator function to be realized and presented. Similar to the embodiment shown in FIGS. 1 through 4, such the receiver may be sufficiently applied to input device that presents feedback of a vibration to a user by the user's sense of touch, which is attached to the electronic equipment such as a mobile phone on a display side.

Figure 6:
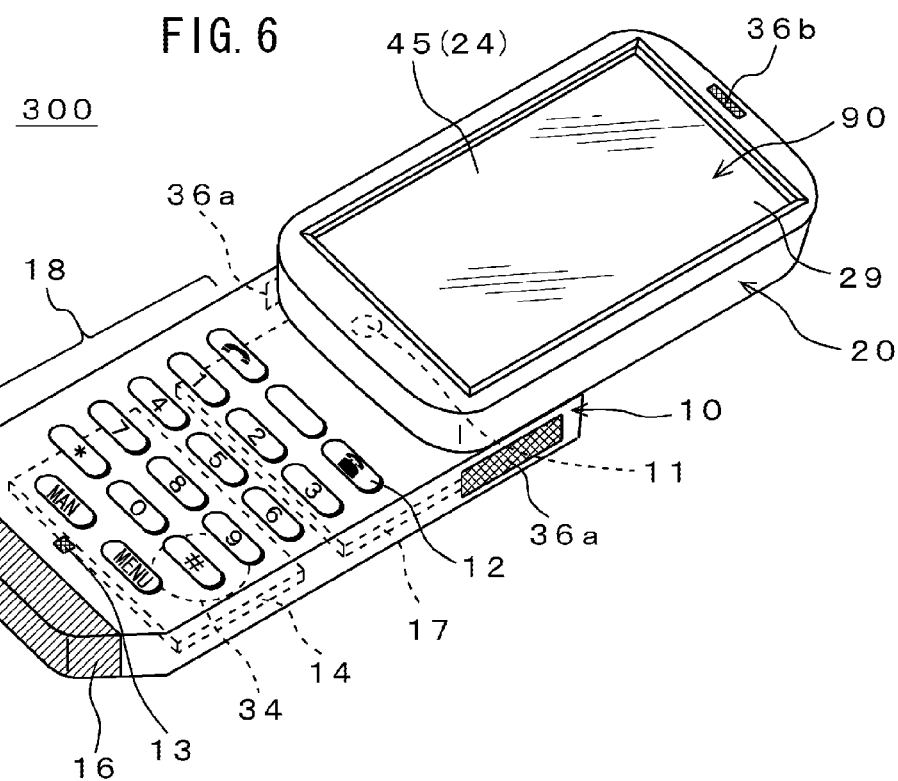
FIG. 6 is a perspective diagram for showing a configuration of a mobile phone that presents feedback of a vibration to a user by the user's sense of touch, to which further embodiment according to the invention is applicable.

FIG. 6 shows a configuration of an embodiment of a mobile phone 300, which presents feedback of a vibration to a user by the user's sense of touch, according to the invention. The mobile phone 300 contains an embodiment of input device 90 according to the invention.

In this embodiment, the mobile phone 300 contains a very small size speaker 36b (a receiver) with an actuator function according to the above embodiment of the invention. When a user touches and forces down input-detecting member 45 on a display panel 29, the mobile phone 300 vibrates the input-detecting member 45 and/or the display panel 29 based on a vibration pattern corresponding to any applied force to a position of the input-detecting member 45 to which the user touches. The mobile phone 300 can present feedback of a vibration to a user by user's sense of touch in response to the touch-and-press-down operation by the user to the input-detecting member 45. The mobile phone 300 can also fix any input using button and/or icon displayed on the display panel 29.

The mobile phone 300 shown in FIG. 6 constitutes electronic equipment and presents feedback of a vibration to the user by the user's sense of touch when the user inputs any information. The mobile phone 300 contains the input device 90 that presents feedback of a vibration to the user by the user's sense of touch when the user touches the input-detecting member 45 on the display panel 29 by his or her finger or slides his or her finger on the input-detecting member 45. The mobile phone 300 also contains a lower casing 10 and an upper casing 20. The lower casing 10 hinges the upper casing 20 rotatably and slidably by, for example, using a rotary joint 11. Relating to the rotary joint 11, a bearing, not shown, that is arranged at a rear surface of the upper casing 20 is rotatably attached to a shaft, not shown, that is arranged at an end of the lower casing 10, so that the upper casing 20 can be slidably connected to a surface of the lower casing 10 with the upper casing 20 being rotatable relative to the lower casing 10 up to ±180 degrees.

The lower casing 10 contains a manipulation panel 18 constituted of a plurality of push button switches 12. The push button switches 12 includes numeral keys 0 through 9, symbol keys such as "*" and "#", hook buttons such as ON and OFF, and menu keys. The lower casing 10 further contains a microphone 13 for a telephone call at a lower portion of the manipulation panel 18. The microphone 13 allows the mobile phone 300 to act as a telephone transmitter.

The lower casing 10 contains a modular antenna 16 at a lowest portion thereof. The lower casing 10 contains acoustic speakers 36a therein on its sides, which sounds a ringtone melody or the like. The lower casing 10 contains a battery 14, a circuit board 17 and the like therein. The lower casing 10 contains a camera 34 on its rear surface.

The upper casing 20 contains the very small size speaker 36b with the actuator function. The speaker 36b acts as the receiver (a telephone receiver) for communication and the actuator that presents feedback of a vibration to a user by the user's sense of touch. The speaker 100 or 200 with the actuator function may be applied to the speaker 36b.

For example, the speaker 36b contains, as shown in FIG. 2, a lid 1 having holes 1a, 1b, 1c, and 1d respectively, at their predetermined positions, the housing 6 covered by the lid 1, a yoke 5 as vibration member containing the hollow portion 5a with a bottom, which is movably positioned within the housing 6, two springs 101, 102 that support the yoke 5 movably within the housing 6, the magnet 4 that is fixed to the bottom in the hollow portion 5a of the yoke 5 movably supported within the housing 6, the coil 3 having the spool axis 3h, which is movably positioned around the magnet 4, and a diaphragm 2 that is attached to the coil 3 at a side of the spool axis 3h of the coil 3 and attached to the housing 6.

Further, as shown in FIG. 4, the spring 101 has a flat and corrugated configuration. An end of the spring 101 is bonded to a portion of an edge portion of the hollow portion 5a of the yoke 5 and the other end of the spring 101 is fixed to a portion of an upper edge of the housing 6. The spring 102 also has a flat and corrugated configuration. An end of the spring 102 is bonded to the other portion of the edge portion of the hollow portion 5a of the yoke 5 and the other end of the spring 102 is fixed to the other portion of the upper edge of the housing 6.

The input device 90 that presents feedback of a vibration to a user by the user's sense of touch is arranged in the upper casing 20 under the speaker 36b. The input device 90 contains the input-detecting member 45 and the display panel 29. The input device 90 presents feedback of a vibration to a user by the user's sense of touch when a user touches the input-detecting member 45 on the display panel and forces the input-detecting member 45 down. The display panel 29 displays any input information such as a plurality of buttons and/or icons.

Figure 7:
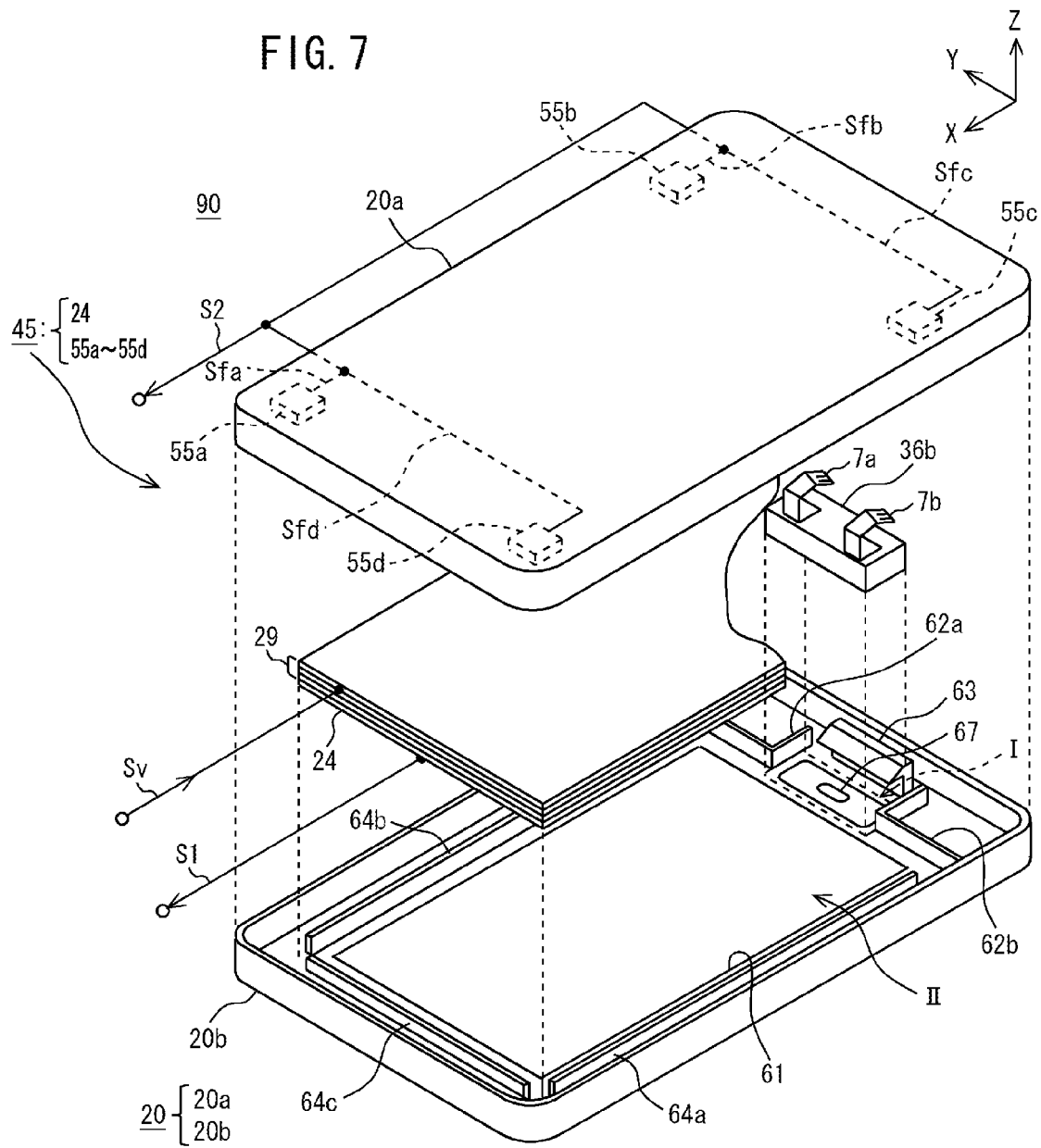
FIG. 7 is an exploded perspective diagram for showing a configuration of a input device that presents feedback of a vibration to a user by the user's sense of touch, to which additional embodiment according to the invention is applicable, the input device being contained in the mobile phone shown in FIG. 6.

FIG. 7 shows a configuration of the input device 90 that presents feedback of a vibration to a user by the user's sense of touch. The input device 90 performs any input operations such that the user touches one of the icons and the like for selecting an input item, which are displayed on the display panel 29, to select the input item on the display panel 29. The input device 90 also presents feedback of a vibration to a user's finger when the user performs such the input operation.

The upper casing 20 contains the input device 90. The upper casing 20 is composed of a base case 20a and a panel case 20b. The input device 90 contains the input-detecting member 45 and the speaker 36b with the actuator function that presents feedback of a vibration to a user's finger based on the user's input operation to the input-detecting member 45. The speaker 36b is attached into the panel case 20b by combining the base case 20a with the panel case 20b.

In this embodiment, a space inside the panel case 20b is classified into two sub-spaces I, II for receiving the parts. The sub-space I receives the speaker 36b, which is used for restricting any movement of the speaker 36b toward its border. In this embodiment, a pair of L-shaped ribs 62a, 62b stands inside the panel case 20b. A hook 63 also stands between the L-shaped ribs 62a, 62b. An opening 67 shown in FIG. 7 is used for the receiver.

The sub-space II receives vibration-transferring member, i.e., the touch panel 24 and the display panel 29, which is used for restricting any movement of the touch panel 24 and the display panel 29 toward their borders. In this embodiment, a pair of straight ribs 64a, 64b stands inside the panel case 20b. A straight rib 64c also stands between the straight ribs 64a, 64b perpendicular to each of the straight ribs 64a, 64b.

The panel case 20b has a display window 61 having a predetermined area. The touch panel 24 and the display panel 29 each having an area larger than that of the display window 61 fit the panel case 20b through the display window 61. Touch panel 24 and force-detecting members 55a through 55d constitutes the input-detecting member 45. In this embodiment, one direction of an input-detecting surface of the input-detecting member 45 is set as X direction; a direction thereof orthogonal to the X direction is set as Y direction; and a direction thereof orthogonal to the X and Y directions is set as Z direction.

The touch panel 24 detects a position where the button or icon is selected. Input information given by the touch panel 24 includes position detection information. The position detection information is obtained from the position detection signal S1 when the user forces the button or icon down and supplied to a control system. The touch panel 24 is formed by a matrix of transparent electrodes as storage electrodes. The touch panel is input device of electrostatic scheme as capacitance sheet.

The display panel 29 having the same area as the touch panel 24 is arranged on the touch panel 24 shown in FIG. 7. As the display panel 29, liquid crystal display panel is used. The liquid crystal display panel is equipped with a back light, not shown. The touch panel 24 and the display panel 29 constitute the vibration-transferring member. The display panel 29 operates so that icons and the like can be displayed thereon based on the position detection information D1 obtained by the touch panel 24 and display signal Sv received from the control system.

Square force-detecting members 55a through 55d are respectively arranged at corners of the base case 20a. The force-detecting members 55a through 55d detect any force pressed or applied by a finger of the user toward the touch panel 24 and generate any force detection information to transmit it. The force-detecting members 55a through 55d fix the input information displayed on a position on the display panel 29 forced by the finger of the user down.

The force-detecting member 55a detects a force detection signal Sfa as an amount of input (of applied force in Z direction) at a right lower corner when the icon is selected. Similarly, the force-detecting member 55b detects a force detection signal Sfb as an amount of input (applied force) at a right upper corner when the icon is selected. The force-detecting member 55c detects a force detection signal Sfc as an amount of input (applied force) at a left upper corner when the icon is selected. The force-detecting member 55d detects a force detection signal Sfd as an amount of input (applied force) at a left lower corner when the icon is selected.

These force-detecting members 55a through 55d are connected to each other in parallel and transmit four force detection signals Sfa, Sfb, Sfc, Sfd to the control system with these four force detection signals being added together, Sfa+Sfb+Sfc+Sfd. Hereinafter, these added force detection signals are referred as "input detection signal S2". The input detection signal S2 is supplied to the control system.

The base case 20a and the panel case 20b are assembled to contain the touch panel 24 and the display panel 29. Each of the base case 20a and the panel case 20b is constituted of a stainless case having a thickness of about 0.3 mm. The base case 20a and the panel case 20b having the display window 61 are assembled to cover the input-detecting member 45 and the display panel 29 contained in an inner space formed between the base case 20a and the panel case 20b.

Figure 8A:
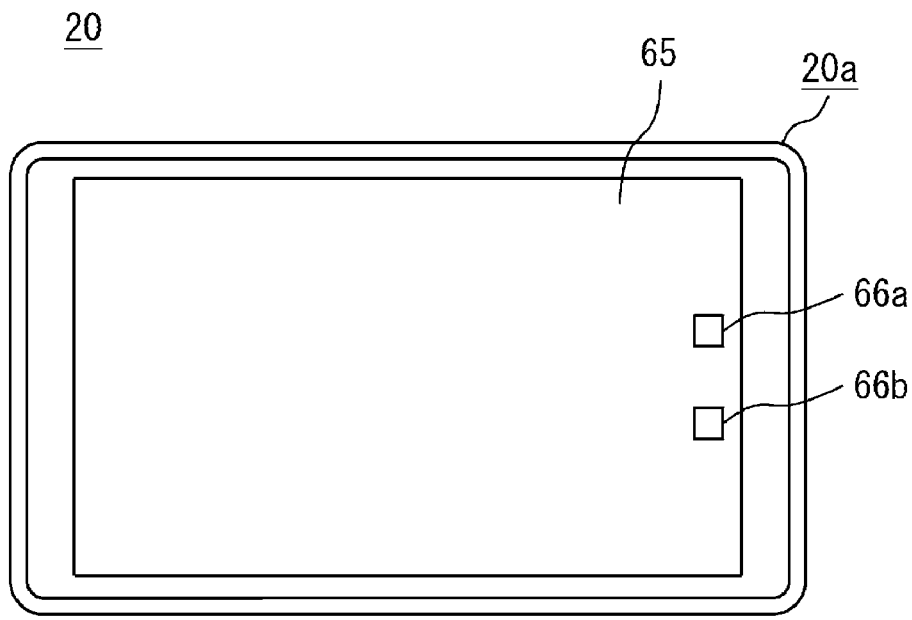
FIG. 8A is a top plan view of an upper case of the input device shown in FIG. 7
Figure 8B:
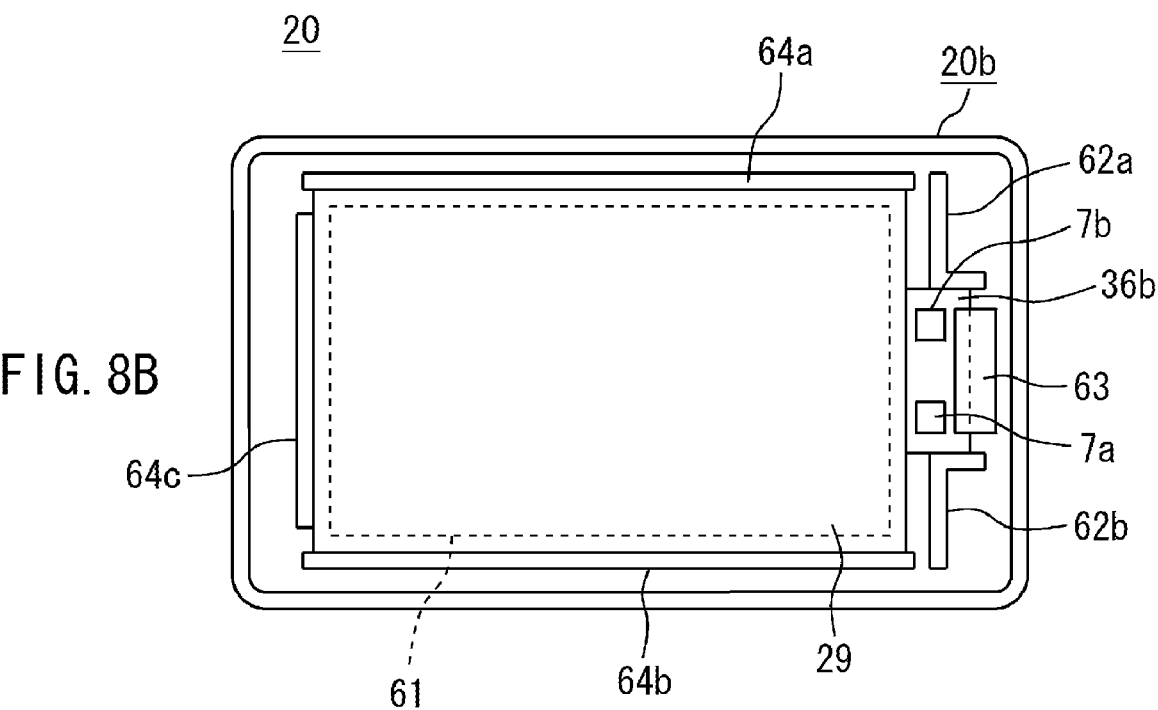
FIG. 8B is a top plan view of a lower case of the input device shown in FIG. 7, which attaches a speaker thereon.
Figure 9:
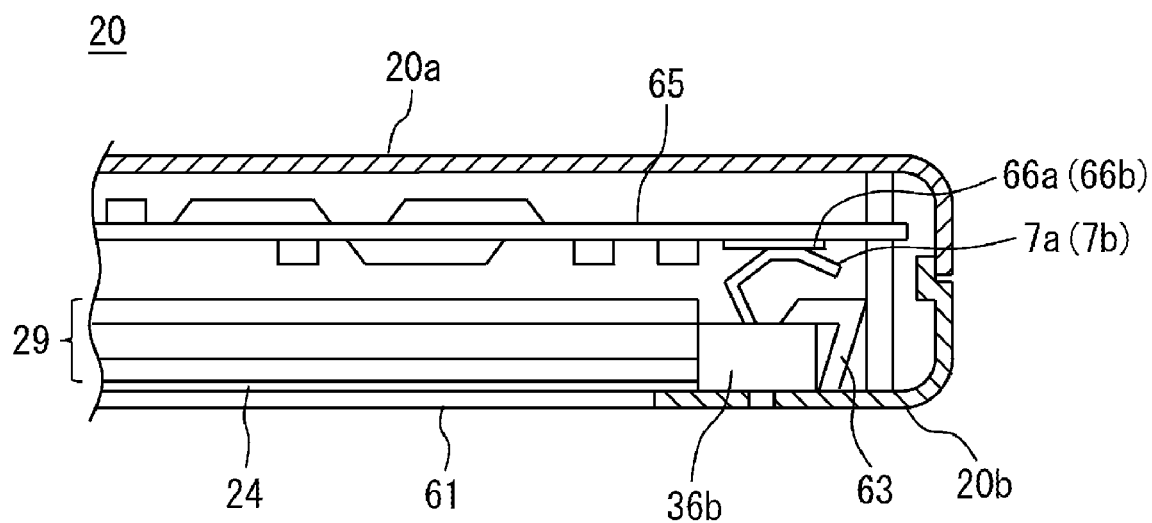
FIG. 9 is a schematic sectional view of an upper casing in the mobile phone for illustrating an attachment of the speaker shown in FIG. 8B.

FIGS. 8A, 8B, and 9 illustrate an attachment of the speaker 36b into the upper casing 20 in the mobile phone 300.

The base case 20a shown in FIG. 8A contains a circuit board 65 for mounting electronic parts thereon. The circuit board 65 mounts plate electrodes 66a, 66b for a speaker, to which an audio signal and/or a vibration generation signal are applied.

In this embodiment, in the panel case 20b shown in FIG. 8B, the pair of the straight ribs 64a, 64b and the straight rib 64c support the touch panel 24 and the display panel 29 with a side of the back light, not shown, of the display panel 29 being faced upward. The touch panel 24 and the display panel 29 are attached so as to be able to move to a right direction in FIG. 8B. In this embodiment, the touch panel 24 and the display panel 29 are install in the panel case 20b with their right side surfaces being respectively connected to (pushed against) a side surface of the speaker 36b.

The pair of L-shaped ribs 62a, 62b and the hook 63 support the speaker 36b in the panel case 20b with its electrodes 7a, 7b being faced upward. The speaker 36b is attached so as to be able to move to a left direction in FIG. 8B. In this embodiment, the speaker 36b is installed in the panel case 20b with its left surface being connected to (pushed against) side surfaces of the touch panel 24 and the display panel 29.

As shown in FIG. 9, the base case 20a and the panel case 20b are then adjusted in position and assembled. In this moment, the plate electrode 66a comes into contact with the electrode 7a to bring them electrical conduction. Similarly, the plate electrode 66b comes into contact with the electrode 7b to bring them electrical conduction. This enables vibration generated by the yoke 5 based on the vibration generation signal in the housing 6 to transmit the touch panel 24 and the display panel 29 when the input-detecting member 45 detects a touch position on the display panel 29 by the user's finger. In this moment, the speaker 36b with the actuator function vibrates the side surfaces of the touch panel 24 and the display panel 29 based on the positional information received from the input-detecting member 45.

Figure 10:
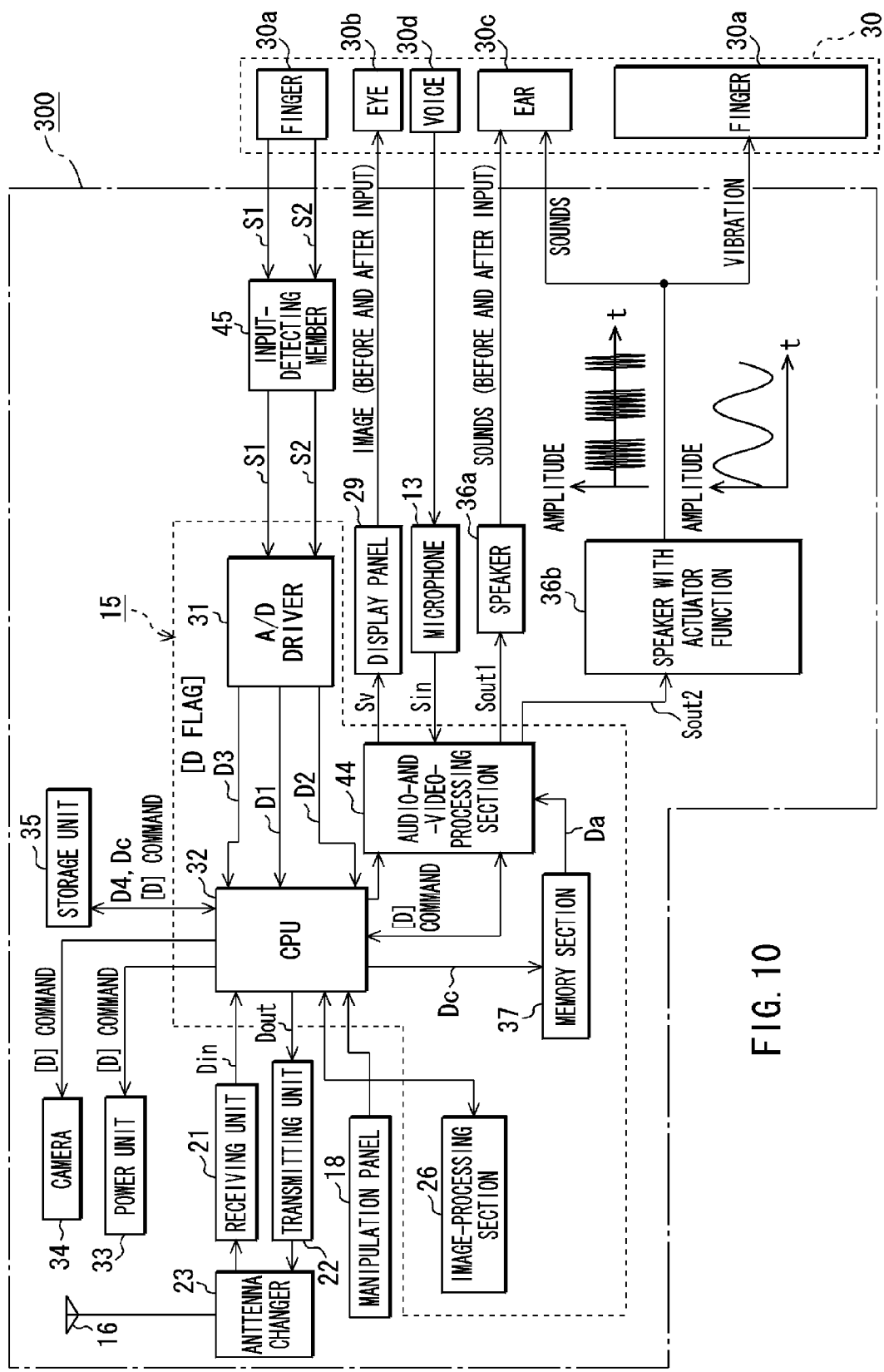
FIG. 10 is a block diagram for illustrating a configuration of a control system in the mobile phone shown in FIG. 6.

The following will describe the mobile phone 300 that presents feedback of a vibration to a user by the user's sense of touch. FIG. 10 illustrates a configuration of the control system in the mobile phone 300 and an example of the feedback of the vibration to the user.

The mobile phone 300 contains various kinds of function blocks installed on the circuit board 17 in the lower casing 10. It is to be noted that like reference characters shown in FIGS. 6 through 9 refer to like elements in this mobile phone 300 shown in FIG. 10. The mobile phone 300 particularly contains a control unit 15, a manipulation panel 18, a receiving unit 21, a transmitting unit 22, an antenna changer 23, the input-detecting member 45, the display panel 29, a power unit 33, a camera 34, a microphone 13, a storage unit 35, the acoustic speaker 36a for ringtone melody, and the speaker 36b with the actuator function.

Although the input-detecting member 45 has been described as the input device of electrostatic scheme in the embodiment shown in FIG. 9, the input-detecting member 45 is not limited thereto. The input-detecting member 45 may distinguish functions of cursor and selection. For example, the input-detecting member 45 may be configured as input device of a resistance film scheme, surface acoustic wave (SAW) scheme, an optical scheme, multistage tactile switches and the like. The input-detecting member 45 may be preferably be configured as input device that gives the position detection information and the force detection information to the control unit 15. The input-detecting member 45 receives at least the position detection information S1 and the input detection information S2 constituted of an amount of input (applied force F) by a finger 30a of the user 30.

The control unit 15 constituting the control system contains an image-processing section 26, an A/D driver 31, an audio-and-video-processing section 44, a CPU 32, and a memory section 37. The A/D driver 31 receives the position detection signal S1 and the input detection signal S2 from the input-detecting member 45. The A/D driver converts an analog signal constituted of the position detection signal S1 and the input detection signal S2 to digital data to distinguish function of cursor from icon selection function. Additionally, the A/D driver 31 calculates such the digital data to detect which is cursor input or icon selection information and to supply flag data D3 indicating the distinction of cursor input or icon selection, the position detection information D1, or the input detection information D2 to the CPU 32. The CPU may carry out such the calculation.

The A/D driver 31 is connected to the CPU 32. The CPU 32 controls whole of mobile phone 300 based on any system programs. The storage unit 35 stores system program data for controlling whole of the mobile phone 300. Random access memory (RAM), not shown, is used for work memory. The CPU 32 reads the system program data out of the storage unit 35 when the power turns on, and sends it to the RAM. The RAM receives the system program data and starts the system to control whole of the mobile phone 300. For example, the CPU 32 controls the A/D driver 31 to send the position detection information D1, the input detection information D2, and the flag data D3 (hereinafter referred to as only "input data") to the CPU 32. The CPU 32 then supplies predetermined command data D to any devices such as the power unit 33, the camera 34, the storage unit 35, the memory section 37, and the audio-and-video-processing section 44. The CPU 32 further controls the receiving unit 21 to receive receiving data and controls the transmitting unit 22 to transmit the data to be transmitted.

In this embodiment, the CPU 32 compares the input detection information D2 received from the input-detecting member 45 through the A/D driver 31 with a previously set force-down-threshold value Fth and controls the memory section 37 to read data out thereof to control the speaker 36b with the actuator function to vibrate based on the comparison result. For example, if user's sense of touch transmitted from the touch panel 24 of the input-detecting member 45 at the force-down position of the display panel 29 is set as sense of touch A or B, the sense of touch A is given by changing a vibration pattern of low frequency and small amplitude in the touch panel 24 and the display panel 29 to a vibration pattern of high frequency and large amplitude in the touch panel 24 and the display panel 29 based on any applied force F by the finger 30a of the user 30 at the force-down position of the touch panel 24 on the display panel 29. The sense of touch B is given by changing a vibration pattern of high frequency and large amplitude in the touch panel 24 and the display panel 29 to a vibration pattern of low frequency and small amplitude in the touch panel 24 and the display panel 29 based on any applied force F by the finger 30a of the user 30 at the force-down position of the touch panel 24 on the display panel 29.

The CPU 32 is connected to the storage unit 35 which stores data for display screen to be displayed on the display panel 29 for input item selection, for example, stores display information D4 for displaying the display screen according to a three-dimensional way, control information Dc relative to selection positions of icons corresponding to the display information D4 and vibration modes, and the like for each display screen. The control information Dc includes special plural vibration waveforms that allows plural different vibrations to be generated, which is in synchronism with an application (three-dimensional display, various kinds of display contents) displayed on the display panel 29, and algorithm for setting special vibration generation modes for each application. As the storage unit 35, EEPROM, ROM, RAM and the like are used.

In this embodiment, the CPU 32 controls the display panel 29 to display contents based on position detection information D1, input detection information D2, and flag data D3 received from the A/D driver 31 and controls output of the speaker 36b with the actuator function. For example, the CPU 32 reads the control information Dc out of the storage unit 35 based on the position detection signal S1 given from the touch panel 24 and the input detection signal S2 given from the force-detecting members 55a through 55d. The CPU 32 then accesses and controls the memory section 37 to supply the vibration generation signal Sout2 to the speaker 36b with the actuator function through the audio-and-video-processing section 44.

The CPU 32 further controls the memory section 37 to read the data out thereof such that if the input-detecting member 45 detects the input detection information D2 that exceeds the force-down-threshold value Fth, the data that presents feedback of the vibration relative to the sense of touch A to the user can be read out and then, if the input-detecting member 45 detects the input detection information D2 that does not exceed the force-down-threshold value Fth, the data that presents feedback of the vibration relative to the sense of touch B to the user can be read out. This enables different vibration patterns to be generated conforming applied force by the finger 30a of the user 30.

The CPU 32 is connected to the memory section 37, from which the vibration generation data Da is read based on the control information Dc received from the CPU 32. The vibration generation data Da contains output waves constituted of sine waves. The memory section 37 is connected to the audio-and-video-processing section 44. Various kinds of items of the vibration generation data Da are supplied to the audio-and-video-processing section 44 where performs any audio processing (digital/analog conversion, amplitude and the like) on the vibration generation data Da to generate a vibration generation signal Sout2 and supply it to the speaker 36b with the actuator function. The speaker 36b with the actuator function vibrates based on the vibration generation signal Sout2.

In this embodiment, the memory section 37 stores the force-down-threshold value Fth corresponding to each application. For example, ROM or the like as the storage unit 35 previously stores the force-down-threshold value Fth as a trigger parameter. The storage unit 35 receives the input detection information D2, compares the applied force F obtained from the input detection information D2 with the previously set force-down-threshold value Fth, under the control of the CPU 32, and determines whether Fth>F or not.

For example, when the force-down-threshold value Fth is set to 100 [gf] in the memory section 37, the touch panel 24 and/or the display panel 29 vibrate based on the vibration pattern for presenting feedback of the vibration to a user by user's sense of touch by means of a classic switch. When the force-down-threshold value Fth is set to 20 [gf] in the memory section 37, the touch panel 24 and/or the display panel 29 vibrate based on the vibration pattern for presenting feedback of the vibration to a user by user's sense of touch by means of a cyber-switch.

The CPU 32 is also connected to the image-processing section 26, in addition to the memory section 37, which performs any image processing on the display information D4 to display three-dimensional buttons or icons. The display information D4 thus image-processed is then supplied to the display panel 29. In this embodiment, the CPU 32 controls the display panel 29 to display three-dimensional perspective buttons or icons in depth on the display screen displayed on the display panel 29.

When the user touches one of the buttons or icons displayed on the display panel 29 for input item selection and forces the touch panel 24 on the display panel 29 down toward Z direction, the input device 90 thus configured presents feedback of the vibration to the user by the user's sense of touch while the user performs any input operations. The user 30 receives the vibration by his or her finger 30a according to his or her sense of touch to feel the vibration for each button or icon.

The user 30 can feel the contents displayed on the display panel 29 by user's sense of sight and feel sounds from the speakers 36a, 36b and the like by user's the sense of hearing. The CPU 32 is connected to the manipulation panel 18, which is used, for example, when inputting telephone number of the party on the other end. The display panel 29 may display any calling image thereon based on the image signal Sv, in addition to the image for icon selection.

The antenna 16 shown in FIG. 10 is connected to the antenna changer 23 and receives radio wave from the party on the other end through a base station when call is accepted. The antenna changer 23 is connected to the receiving unit 21 that receives the data from the antenna 16, performs demodulation processing relative to audio and video or the like, and transmits the demodulated audio and video data to the CPU 32. The receiving unit 21 is connected to the audio-and-video-processing section 44, through the CPU 32, which converts digital audio data to analog audio data to generate and transmit an audio signal Sout and converts digital video data to analog image data to generate and transmit an image signal Sv.

The audio-and-video-processing section 44 is connected to the acoustic speaker 36a and the speaker 36b with the actuator function for the receiver. The acoustic speaker 36a sounds any ringtone or ringtone melody based on the acoustic signal Sout1 when call is accepted. The speaker 36b receives the audio signal Sout2 to increase a voice 30d of the party on the other end. The speaker 36b vibrates based on the vibration generation signal Sout2 when presenting feedback of the vibration to the user.

The audio-and-video-processing section 44 is connected to the microphone 13 constituting a transmitter, which collects voice of the user to generate and transmit the audio signal Sin. The audio-and-video-processing section 44 converts analog audio signal Sin to be sent to the party on the other end to digital audio data and output it when originating a call or converts analog image signal Sv to be sent to the party on the other end to digital image data and output it.

The CPU 32 is also connected to the transmitting unit 22, in addition to the receiving unit 21, which performs any modulation processing on the audio and video data Dout to be sent to the party on the other end and supplies the antenna 16 with the modulated transmission data through the antenna changer 23. The antenna 16 radiates radio wave supplied from the antenna changer 23 toward the base station.

The above-mentioned CPU 32 is further connected to the camera 34, in addition to the transmitting unit 22, which takes a photograph on a subject and sends still image information or motion video information to the party on the other end through the transmitting unit 22. The camera 34 may be provided on the upper casing 20 at its rear surface side. The power unit 33 contains a battery 14 and supplies DC power to the CPU 32, the manipulation panel 18, the receiving unit 21, the transmitting unit 22, the display panel 29, the camera 34, the storage unit 35, the memory section 37, the audio-and-video-processing section 44, and the input-detecting member 45. Although it has been described that the memory section 37 is separated from the audio-and-video-processing section 44 in this embodiment, the audio-and-video-processing section 44 contains any storage device, which enables the parts to be decreased in number.

Figure 11A:
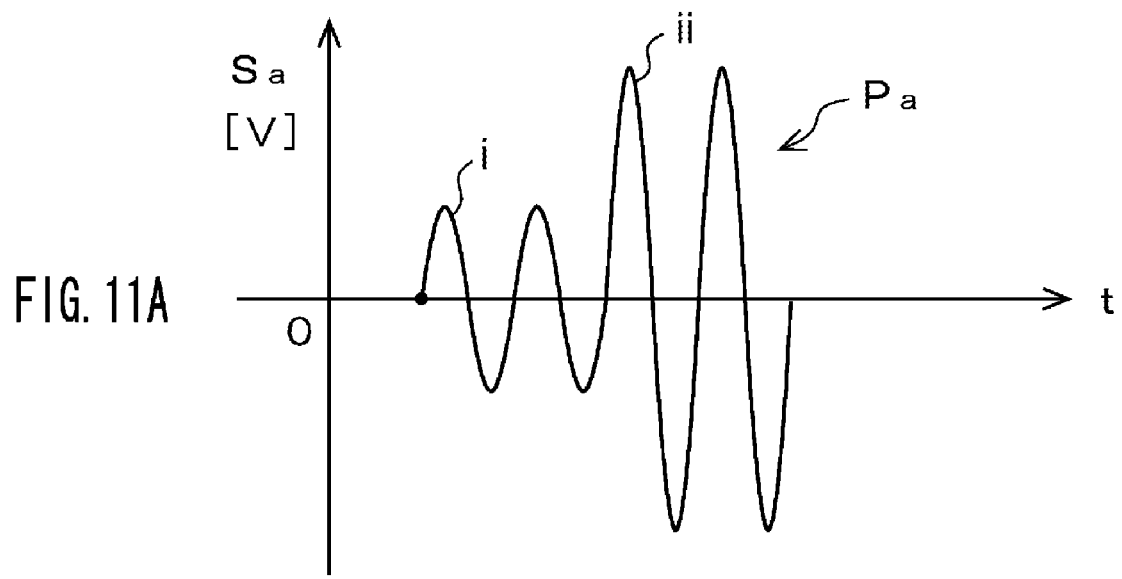
FIGS. 11A and 11B are wave form graphs each for showing a pattern of vibration that is fed back to a user.
Figure 11B:
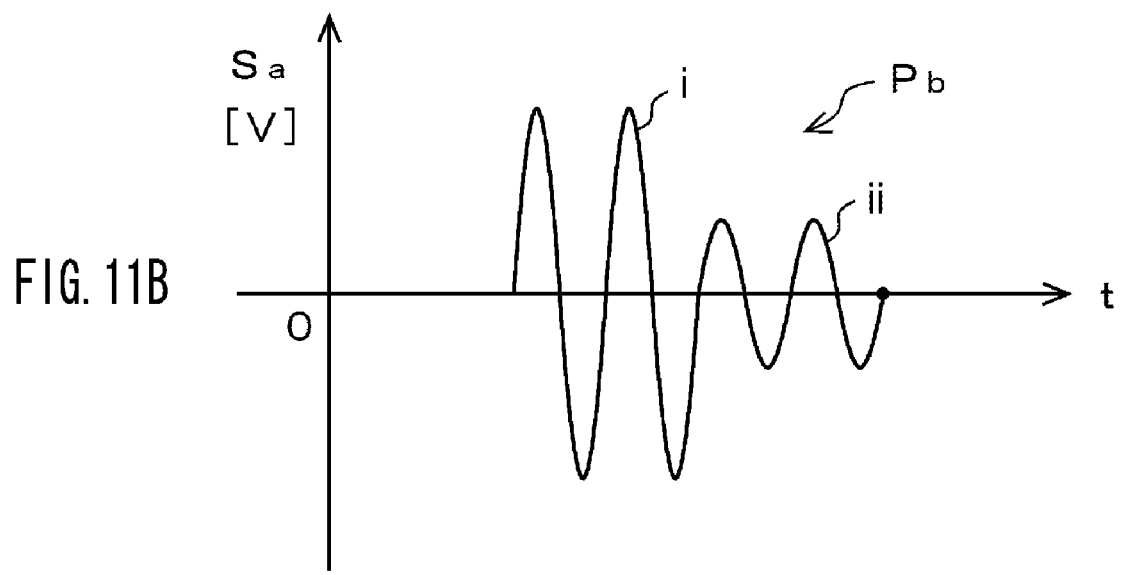

FIGS. 11A and 11B show vibration patterns relative to the senses of touch A and B. In FIGS. 11A and 11B, the horizontal axis indicates a period of time t and the vertical axis indicates amplitude Ax (V) of the vibration generation signal Sa. In this embodiment, it is supposed that when the button or icon is forced down, the vibration pattern relative to the sense of touch A is used and when the button or icon is released, the vibration pattern relative to the sense of touch B is used.

A first vibration pattern Pa shown in FIG. 11A relates to the sense of touch A. Such the vibration pattern Pa is carried out under a situation such that when the button or icon is forced down, the force-down-threshold value Fth does not exceed the applied force F, Fth<F. At a first stage thereof, the vibration pattern Pa of frequency fx=50 Hz, an amplitude Ax=5 μm, a number of times Nx=2 for a period of time of about 0.1 second is carried out. Hereinafter, such the vibration pattern is described as [fx, Ax, Nx]=[50 5 2]. Similarly, at a second stage thereof, the vibration pattern Pa of [fx, Ax, Nx]=[100 10 2] for a period of time of about 0.1 second is carried out.

A second vibration pattern Pb shown in FIG. 11B relates to the sense of touch B. Such the vibration pattern Pb is carried out under a situation such that when the button or icon is released after it has forced down, the force-down-threshold value Fth exceeds the applied force F, Fth>F. At a first stage thereof, the vibration pattern Pb of [fx, Ax, Nx]=[80 8 2] for a period of time of about 0.1 second is carried out. Similarly, at a second stage thereof, the vibration pattern Pb of [fx, Ax, Nx]=[40 8 2] for a period of time of about 0.1 second is carried out. If the touch panel 24 and/or the display panel 29 vibrate based on these vibration patterns, the sense of touch as the cyber-switch or the like can be presented to the user.

Figure 12A:
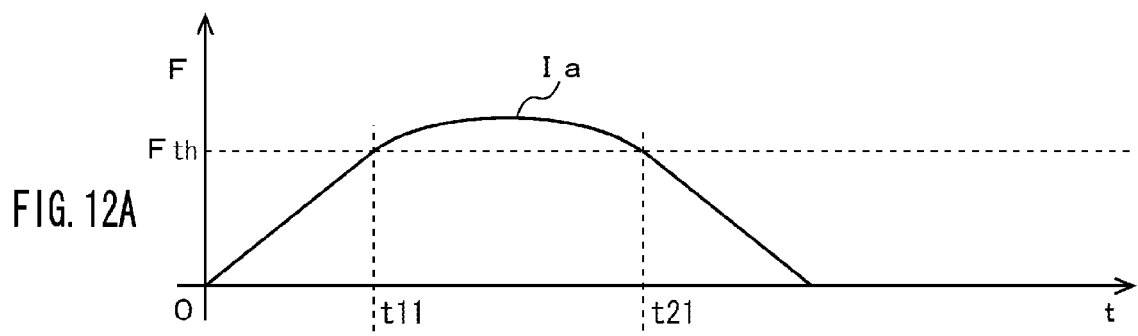
FIGS. 12A and 12B are graphs for showing an example of a relationship between applied force and vibration patterns.
Figure 12B:
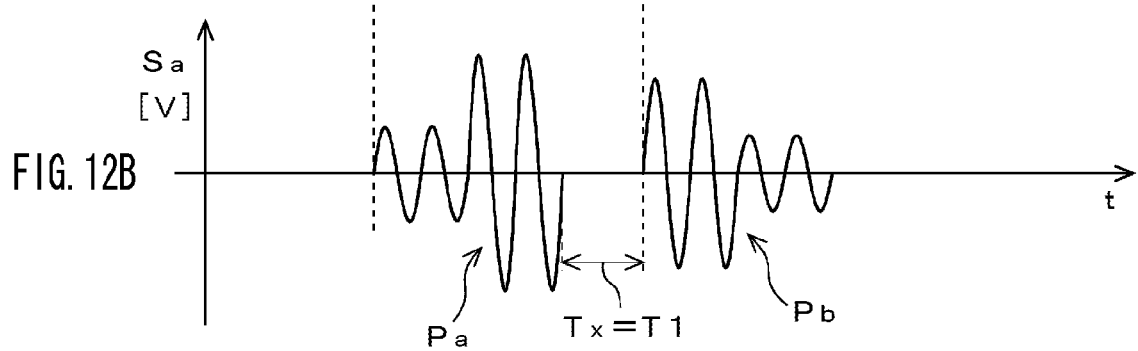

FIGS. 12A and 12B show an example of a relationship between the applied force F and the vibration patterns. In FIG. 12A, the vertical axis indicates the applied force F, which is obtained from the input detection signal S2 (digitalized input detection information D2). In FIG. 12B, the vertical axis indicates amplitude (V) of the vibration generation signal Sa. In FIGS. 12A and 12B, each of the horizontal axes indicates a period of time t.

There is generally an input motion peak in the button switch operation or the like. It is known that when the button switch is forced down at a force-down speed in design terms, the applied force F therefor is about 30 through 240 [gf]. FIG. 12A shows a wave form Ia of the applied force distribution, in which the applied force F along the Z direction at the force-down speed as a reference when the input device is designed is reflected.

In this embodiment, the force-down-threshold value Fth is previously set to the input detection signal S2 obtained from input-detecting member 45. The CPU 32 controls the memory section 37 to read out thereof the data relative to the first vibration pattern Pa at a point of time t11 when the applied force F exceeds the force-down-threshold value Fth and the data relative to the second vibration pattern Pb at a point of time t21 when the applied force F does not exceed the force-down-threshold value Fth.

Thus, when the CPU 32 or the like detects a state of Fth<F if the input-detecting member 45 detects the applied force F as the reference when the input device is designed, a vibration based on the vibration pattern Pa relative to the sense of touch A can occur. When the CPU 32 or the like detects a state of Fth>F, a vibration based on the vibration pattern Pb relative to the sense of touch B can occur. It is to be noted that a gap period Tx=T1 when no vibration occurs is provided between these vibrations. This gap period Tx varies based on the force-down speed along the Z direction.

FIGS. 13A and 13B show another example of the relationship between the applied force F and the vibration patterns. In FIG. 13A, the vertical axis indicates the applied force F, which is obtained from the input detection signal S2 (digitalized input detection information D2). In FIG. 13B, the vertical axis indicates amplitude (V) of the vibration generation signal Sa. In FIGS. 12A and 12B, each of the horizontal axes indicates a period of time t.

FIG. 13A shows a wave form IIa of the applied force distribution, in which the applied force F along the Z direction at the force-down speed of the button or icon or the like faster than the reference force-down speed shown in FIG. 12A is reflected.

In this embodiment, similar to the case shown in FIG. 12A, the force-down-threshold value Fth is previously set to the input detection signal S2 obtained from input-detecting member 45. The CPU 32 controls the memory section 37 to read out thereof the data relative to the first vibration pattern Pa at a point of time t12 when the applied force F exceeds the force-down-threshold value Fth and the data relative to the second vibration pattern Pb at a point of time t22 when the applied force F does not exceed the force-down-threshold value Fth.

Thus, when the CPU 32 or the like detects a state of Fth<F if the input-detecting member 45 detects the applied force F at the force-down speed of the button or icon or the like faster than the reference force-down speed, a vibration based on the vibration pattern Pa relative to the sense of touch A can occur. When the CPU 32 or the like detects a state of Fth>F, a vibration based on the vibration pattern Pb relative to the sense of touch B can occur. It is to be noted that a gap period Tx=T2 (T2<T1) when no vibration occurs is provided between these vibrations.

Thus, even if force-down speed of the button or icon or the like is faster than the reference force-down speed when designed, the vibration based on the vibration pattern Pa relative to the sense of touch A feeds back to the user at a first half thereof, which gives the user any loaded reactions having click feeling, while the vibration based on the vibration pattern Pb relative to the sense of touch B feeds back to the user at a second half thereof, which gives the user any released reactions having click feeling. In this embodiment, if the force-down-threshold value Fth is set to 100 [gf], the user can receive feedback of classic switch feeling by his or her sense of touch.

The following will describe an example of information processing in the mobile phone 300. FIG. 14 shows the example of information processing in an embodiment of the mobile phone 300 according to the invention.

In this embodiment, it is supposed that the mobile phone 300 contains the speaker 100 or 200 with the actuator function and the user 30 inputs any information by touching and forcing down the touch panel 24 on the display panel 29 in the mobile phone 300 by his or her finger 30a. The mobile phone 300 has a function (algorithm) to process the wave form by setting the applied force F by the user's finger 30a and the like as a parameter, in the same vibration mode. The CPU 32 can calculate the applied force F from the input detection information D2, perform the discrimination corresponding to the conditions shown in FIG. 12A, and generate vibrations corresponding to any input movements in the input operations in the same vibration mode.

Under such the information-processing situations, the CPU 32 waits for power-on at step G1 in the flowchart shown in FIG. 14. For example, the CPU 32 detects any power-on information to start the system of the mobile phone 300. The power-on information is generally generated when clock function of the mobile phone 300 starts and the power switch in the mobile phone 300 under the sleep mode turns on.

The process goes to step G2 where the CPU 32 controls the display panel 29 to display icons thereon. For example, the CPU 32 controls the display panel 29 to receive the display data D4 and display input information on the screen. The user can view the input information, i.e., icons or the like, displayed on the display panel 29 through the input-detecting member 45 having the touch panel 24.

The process goes to step G3 where the CPU 32 selects process mode from button-or-icon-input mode and other modes. The button-or-icon-input mode refers to as input operation mode such that an icon or the like is forced down when selecting the icon or the like from the buttons or icons displayed on the display panel 29.

When the CPU 32 selects the button-or-icon-input mode, icon or button is forced down. In this moment, the process goes to step G4 where the CPU 32 calculates the allied force F based on the input detection information D2. The force-detecting members 55a through 55d detect the applied force F at the forced-down position of the touch panel 24 by the user's finger 30a and transmit the input detection signal S2 to the A/D driver 31. The A/D driver 31 converts the analog input detection signal S2 to the digital input detection information D2 and transfers the digital input detection information D2 to the CPU 32.

The process then goes to step G5 where the CPU 32 compares the applied force F with the force-down-threshold value Fth and determines whether or not the applied force F exceeds the force-down-threshold value Fth, F>Fth. If the applied force F exceeds the force-down-threshold value Fth, F>Fth, the process goes to step G6 where the speaker 36b with the actuator function vibrates the touch panel 24 and/or the display panel 29 based on the vibration pattern Pa corresponding to the applied force F by the user's finger 30a, thereby enabling the user to obtain the sense of touch A.

For example, the sense of touch A is based on the vibration pattern Pa as shown in FIG. 11A under a situation such that at a first stage thereof, the vibration pattern Pa of [fx, Ax, Nx]= [50 5 2] for a period of time of about 0.1 second and at a second stage thereof, the vibration pattern Pa of [fx, Ax, Nx]=[100 10 2] for a period of time of about 0.1 second. This enables different vibration patterns to generate corresponding to the applied force by the user.

The process then goes to step G7 where the CPU 32 further detects the applied force F. The applied force F is detected by the force-detecting members 55a through 55d so that the icon or button is released after it has been forced down. In this moment, the force-detecting members 55a through 55d detect the applied force F when the user's finger 30a is released from the touch position of the touch panel 24 on the display panel 29 and generates the input detection signal S2 to transmit it to the A/D driver 31. The A/D driver 31 converts the analog input detection signal S2 to the digital input detection information D2 and transfers the digital input detection information D2 to the CPU 32.

The process then goes to step G8 where the CPU 32 compares the applied force F with the force-down-threshold value Fth and determines whether or not the applied force F does not exceed the force-down-threshold value Fth, F<Fth. If the applied force F does not exceed the force-down-threshold value Fth, F<Fth, the speaker 36b with the actuator function vibrates, at step G9, the touch panel 24 and/or the display panel 29 based on the vibration pattern Pb corresponding to the applied force F by the user's finger 30a, thereby enabling the user to obtain the sense of touch B.

The sense of touch B is based on the vibration pattern Pb as shown in FIG. 11B under a situation such that at a first stage thereof, the vibration pattern Pb of [fx, Ax, Nx]=[80 8 2] for a period of time of about 0.1 second and at a second stage thereof, the vibration pattern Pb of [fx, Ax, Nx]=[40 8 2] for a period of time of about 0.1 second. This enables different vibration patterns to generate corresponding to the applied force by the user.

The process then goes to step G10 where the input is fixed. In this moment, the CPU 32 fixes the input information displayed on the forced-down position of the display panel 29. The process then goes to step G12.

If the other processing modes are selected in the step G3, the process goes to step G11 where the other processing modes are performed. The other processing modes include telephone mode, mail-creating mode, transmission display mode and the like. The telephone mode includes operation of calling to the party on the other end. The button or icon includes character-input items when the telephone mode is selected.

After the other processing modes have been performed, the process goes to step G12. At the step G12, the CPU 32 determines whether or not the operation finishes. For example, the CPU 32 finishes the information processing by detecting the power-off information. If the power-off is not detected, the process goes back to the step G2 where any icons such as menu are displayed on the display panel 29 and the above-mentioned process repeats.

Thus, because the mobile phone 300 to which the embodiment of input device 90 according to the invention is applied contains the embodiment of the speaker 36b with the actuator function according to the invention, the mobile phone 300 can act a receiver when an audio signal is applied to the coil 3 that is movably positioned around the magnet 4.

Further, when applying a low frequency (for example, 213 Hz) signal for feedback of a vibration to a user to the coil 3, the mobile phone 300 can vibrate the yoke 5 in the speaker 36b based on the resonance frequency fo given by the expression (1) that is in inverse proportion to a square root of the cube of the length of the spring 101 or 102 having a flat and corrugated configuration and is in proportion to a square root of the cube of the thickness of the spring.

The corrugated portions 101A, 102A of the springs 101, 102 having the corrugated shape can convert a direction of a vibration generated along the spool axis 3h of the coil 3 to a direction perpendicular to the spool axis 3h of the coil 3. Because the speaker 36b with the actuator function can be reduced in size as compared with an electrostatic actuator and be also reduced in power consumption, the mobile phone 300 can be reduced in size and be also reduced in power consumption.

The vibration generation data is converted to high voltage one for driving the actuator by using a special driver and is supplied to the electrostatic actuator while in the mobile phone 300 containing the speaker 36b with the actuator function, the audio-and-video-processing section 44 can treat the vibration generation data like the audio signal Sout1. This enables to be presented the mobile phone 300 that contains the very small size speaker 36b (receiver) with the actuator function but contains no special actuator driving circuit, which resulting in an decrease in costs of manufacture of the mobile phone 300. The mobile phone 300 can present feedback of a vibration to a user like the classic (analog) switch or cyber-switch by the user's sense of touch corresponding to the force-down operation by user's finger 30a to the touch panel 24 on the display panel 29.

Figure 15:
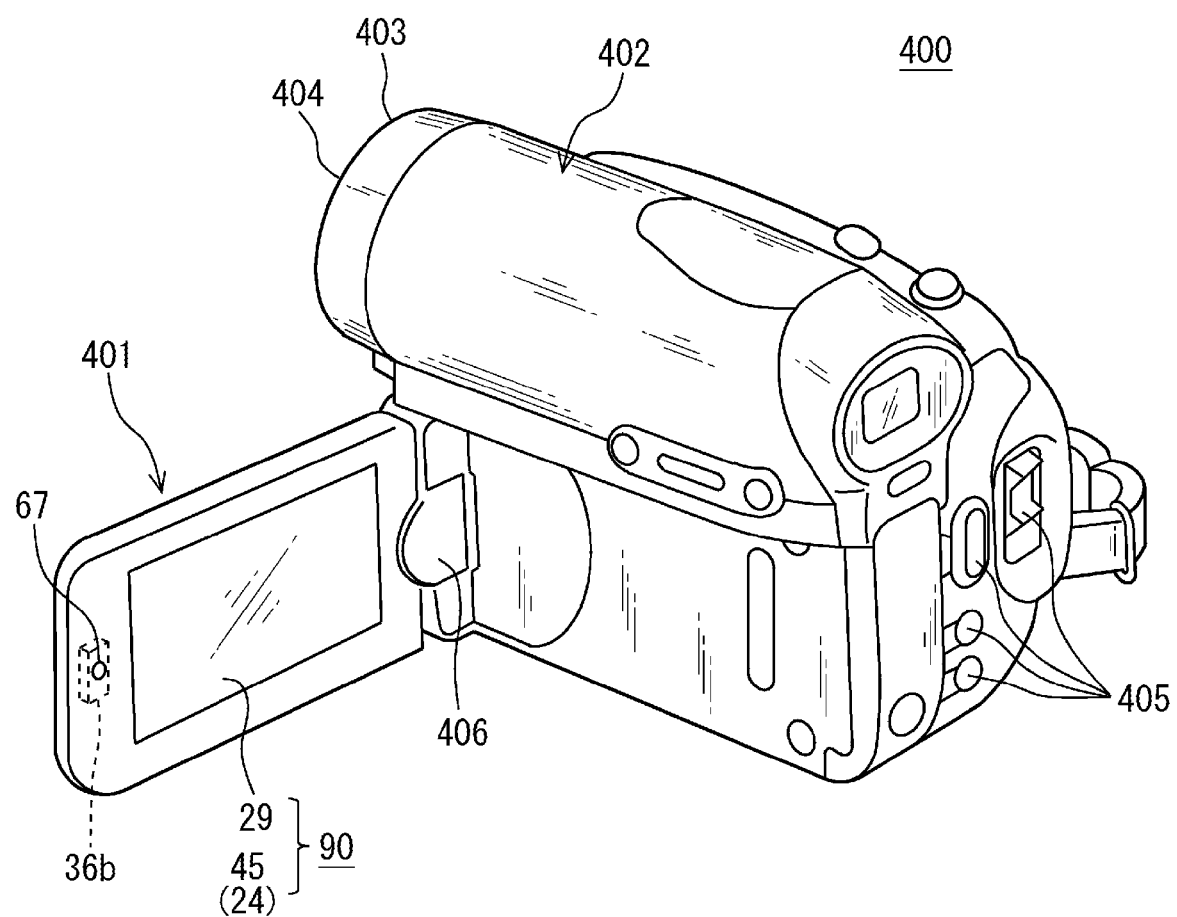
FIG. 15 is a perspective diagram for showing a configuration of a video camera that presents feedback of a vibration to a user by the user's sense of touch, to which still another embodiment according to the invention is applicable.

FIG. 15 shows a configuration of a video camera 400 that presents feedback of a vibration to a user by the user's sense of touch, to which still another embodiment according to the invention is applied. The video camera 400 contains an embodiment of the input device 90 according to the invention, to which the speaker 36*b* with the actuator function is applied.

This video camera 400 constitutes electronic equipment that presents feedback of a vibration to a user by the user's sense of touch when the user inputs information to the video camera. The video camera 400 shoots a subject and records surrounding sounds.

The video camera 400 contains a case 402 and a lens body tube 403 in which imaging optical system 404 is installed upper and in front of the case 402. An image pickup element, not shown, used for shooting the subject by receiving an image of the subject guided by the imaging optical system 404 is installed in the lens body tube 403 behind the lens.

Various kinds of operation switches 405 such as a power switch, a shooting start/stop switch, and a zoom switch are provided on rear, upper, and side surfaces of the case 402. On the left side surface of the case 402, a touch panel display device 401 is interconnected to the case 402 through the hinge 406 by opening or closing the touch panel display device 401. The touch panel display device 401 displays the image of the subject received by the image pickup element, not shown.

The touch panel display device 401 contains the input device 90 and the speaker 36*b* with the actuator function as described above.

For example, as the speaker 36*b* contained in the touch panel display device 401, the speaker 100 shown in FIG. 2 is used, which contains a lid 1 having openings 1*a*, 1*b*, 1*c*, and 1*d* at predetermined positions, a housing 6 on which the lid is attached, the yoke 5 as the vibration member containing the a hollow portion 5*a* with a bottom, which is movably positioned within the housing 6, the springs 101, 102 supporting the yoke 5 movably in the housing 6, the magnet 4 fixed to a bottom in the hollow portion 5*a* of the yoke 5 movably supported within the housing 6, the movable coil 3 having the spool axis 3*h*, which is movably positioned around the magnet 4, and the diaphragm 2 attached to the coil 3 at a side of the spool axis 3*h* of the coil 3, an outer edge of which is attached to the housing 6 by holding the outer edge of the diaphragm 2 on the upper edge of the housing 6 by the lid 1.

An end of the spring 101 having a flat and corrugated configuration, as shown in FIG. 4, is bonded to a portion of an edge portion of the hollow portion 5*a* of the yoke 5, and the other end of the spring 101 is fixed to a portion of an upper edge of the housing 6. An end of the spring 102 having a flat and corrugated configuration is bonded to the other portion of the edge portion of the hollow portion 5*a* of the yoke 5, and the other end of the spring 102 is fixed to the other portion of the upper edge of the housing 6.

In this embodiment, if the user manipulates an icon for input operation displayed on the monitor display panel 29 in the touch panel display device 401 by his or her finger, the video camera 400 allows the speaker 36*b* to radiate any click sounds (cyber-switch operation sounds) and presents feedback of a vibration to the user's finger touching the monitor display panel 29 by the user's sense of touch. Such the input operation enables input by the button or icon displayed on the monitor display panel 29 to be fixed in the video camera 400. It is to be noted that an opening 67 is used so that any click sound can be heard therefrom outside.

Accordingly, because the embodiment of the video camera 400 contains the embodiment of the input device 90 that presents feedback of the vibration to the user by the user's sense of touch, the video camera 400 can generate any click sounds if a signal relative to the click sounds is applied to the coil 3 movably positioned around the magnet 4 in the speaker 36*b*. This enables the speaker 36*b* in the video camera 400 to act as a speaker for click sounds, which radiates a relative small amount of sound effect according to the user's operation in the video camera 400.

When applying a low frequency (for example, 213 Hz) signal for feedback of a vibration to a user to the coil 3 according to the user's operation to the input-detecting member 45 in the video camera 400, the video camera 400 can vibrate the yoke 5 based on the resonance frequency fo given by the expression (1) that is in inverse proportion to a square root of the cube of the length of the spring 101 or 102 having a flat and corrugated configuration and is in proportion to a square root of the cube of the thickness of the spring 101 or 102.

Thus, the video camera 400 can present feedback of a vibration to the user's finger by the user's sense of touch when the user touches and manipulates the touch panel display device 401. This enables to be presented the video camera 400 (as the electronic equipment) containing the input device 90, which presents feedback of a vibration to the user by the user's sense of touch, containing the very small size speaker 36*b* with the actuator function. Because this speaker 36*b* acts as a speaker and an actuator, the video camera 400 can be reduced in size.

Although the electronic equipment has been described as the mobile phone 300 of slide type and the video camera 400, to which the input device 90 is applied, this invention is not limited thereto. Of course, this invention may apply to a mobile phone of biaxial hinged type, a mobile phone of straight type, a mobile phone having both of the lower casing 10 with a display screen and the upper casing 20 with a display screen, and a digital camera.

This invention is very preferably applied to an information-processing device, a mobile phone, and a personal digital assistant (PDA), which can realizes feedback of a vibration to a user by the user's sense of touch when the user inputs the information by selecting an icon from the icons and the like displayed on a display screen for input item selection.

It should be understood by those skilled in the art that various modifications, combinations, sub-combinations and alternations may occur depending on design requirements and other coefficients insofar as they are within the scope of the appended claims or the equivalents thereof.

What is claimed is:

1. A vibration assembly comprising:
    a container;
    a vibration member containing a hollow portion with a bottom, the vibration member being movably positioned within the container;
    at least two support members that support the vibration member movably within the container;
    a magnetic body that is fixed to the bottom in the hollow portion of the vibration member movably supported within the container;
    a coil having a spool axis, the coil being movably positioned around the magnetic body; and
    a diaphragm that is attached to the coil at a side of the spool axis of the coil and attached to the container,
    wherein one of the support members has a flat and corrugated configuration, an end of the one of the support members is bonded to a portion of an edge portion of the hollow portion of the vibration member, and the other end of the one of the support members is fixed to a portion of an upper edge of the container; and
    wherein other support member has a flat and corrugated configuration, an end of the other support member is bonded to the other portion of the edge portion of the hollow portion of the vibration member, and the other end of the other support member is fixed to the other portion of the upper edge of the container.

2. The vibration assembly according to claim 1 wherein the vibration member contains a resonance frequency fo given by an expression, $fo = \frac{1}{2}\pi \times \{\sqrt{n(3E(bh^3/12))/Ml^3}\}$ where l indicates a length of each of the support members, h indicates a thickness of each of the support members, b indicates a width of each of the support members, n indicates number of the support members, M indicates a load that is imposed on the support members, and E indicates Young's modulus.

3. The vibration assembly according to claim 1 wherein the support members convert a direction of a vibration generated along the spool axis of the coil to a direction perpendicular to the spool axis of the coil.

4. Input device that presents feedback of a vibration to a user by the user's sense of touch when the user inputs information to the device, the input device comprising:
input-detecting unit that detects an input manipulation by the user; and
a vibration assembly that presents feedback of the vibration to the user by the user's sense of touch based on the user's manipulation on the input-detecting unit,
wherein the vibration assembly contains:
a container;
a vibration member containing a hollow portion with a bottom, the vibration member being movably positioned within the container;
at least two support members that support the vibration member movably within the container;
a magnetic body that is fixed to the bottom in the hollow portion of the vibration member movably supported within the container;
a coil having a spool axis, the coil being movably positioned around the magnetic body; and
a diaphragm that is attached to the coil at a side of the spool axis of the coil and attached to the container,
wherein one of the support members has a flat and corrugated configuration, an end of the one of the support members is bonded to a portion of an edge portion of the hollow portion of the vibration member, and the other end of the one of the support members is fixed to a portion of an upper edge of the container; and
wherein other support member has a flat and corrugated configuration, an end of the other support member is bonded to the other portion of the edge portion of the hollow portion of the vibration member, and the other end of the other support member is fixed to the other portion of the upper edge of the container.

5. The input device according to claim 4 further comprising a display unit that displays an input selection item on a display screen manipulated by the user through the input-detecting unit,
wherein the input-detecting unit detects a touch position on the display screen by a user who performs input manipulation; and
wherein the vibration assembly vibrates the display unit or the input-detecting unit along a lateral direction thereof based on positional information given by the input-detecting unit.

6. The input device according to claim 5 wherein the vibration assembly contacts a side surface of any one of the input-detecting unit and the display unit.

7. Electronic equipment that presents feedback of a vibration to a user by the user's sense of touch when the user inputs information to the equipment, the electronic equipment comprising input device,
wherein the input device includes:
input-detecting unit that detects an input manipulation by the user; and
a vibration assembly that presents feedback of the vibration to the user by the user's sense of touch based on the user's manipulation on the input-detecting unit, and wherein the vibration assembly contains:
a container;
a vibration member containing a hollow portion with a bottom, the vibration member being movably positioned within the container;
at least two support members that support the vibration member movably within the container;
a magnetic body that is fixed to the bottom in the hollow portion of the vibration member movably supported within the container;
a coil having a spool axis, the coil being movably positioned around the magnetic body; and
a diaphragm that is attached to the coil at a side of the spool axis of the coil and attached to the container,
wherein one of the support members has a flat and corrugated configuration, an end of the one of the support members is bonded to a portion of an edge portion of the hollow portion of the vibration member, and the other end of the one of the support members is fixed to a portion of an upper edge of the container; and
wherein other support member has a flat and corrugated configuration, an end of the other support member is bonded to the other portion of the edge portion of the hollow portion of the vibration member, and the other end of the other support member is fixed to the other portion of the upper edge of the container.

* * * * *